US010918941B2

(12) United States Patent
Kolen et al.

(10) Patent No.: US 10,918,941 B2
(45) Date of Patent: Feb. 16, 2021

(54) PREDICTIVE EXECUTION OF DISTRIBUTED GAME ENGINES

(71) Applicant: Electronic Arts, Inc., Redwood City, CA (US)

(72) Inventors: John Kolen, Foster City, CA (US); Harold Henry Chaput, Belmont, CA (US); Navid Aghdaie, San Jose, CA (US); Kazi Atif-Uz Zaman, Foster City, CA (US); Kenneth Alan Moss, Redwood City, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 119 days.

(21) Appl. No.: 16/366,897

(22) Filed: Mar. 27, 2019

(65) Prior Publication Data

US 2020/0306632 A1  Oct. 1, 2020

(51) Int. Cl.
| | | |
|---|---|---|
| *A63F 13/358* | (2014.01) | |
| *A63F 13/355* | (2014.01) | |
| *A63F 13/67* | (2014.01) | |
| *A63F 13/352* | (2014.01) | |
| *A63F 13/79* | (2014.01) | |
| *A63F 13/31* | (2014.01) | |
| *A63F 13/52* | (2014.01) | |

(52) U.S. Cl.
CPC .......... *A63F 13/358* (2014.09); *A63F 13/352* (2014.09); *A63F 13/355* (2014.09); *A63F 13/67* (2014.09); *A63F 13/79* (2014.09); *A63F 13/31* (2014.09); *A63F 13/52* (2014.09); *A63F 2300/535* (2013.01); *A63F 2300/538* (2013.01)

(58) Field of Classification Search
CPC ...... A63F 13/355; A63F 13/358; A63F 13/67; A63F 13/79; A63F 13/31; A63F 13/352; A63F 13/52
See application file for complete search history.

(56) References Cited

U.S. PATENT DOCUMENTS

| | | | |
|---|---|---|---|
| 7,803,054 B1 * | 9/2010 | Ogus ...................... | A63F 13/358 463/42 |
| 9,069,441 B2 * | 6/2015 | Jacob .................... | A63F 13/211 |
| 9,338,622 B2 * | 5/2016 | Bjontegard ............. | H04L 67/18 |

(Continued)

OTHER PUBLICATIONS

U.S. Appl. No. 15/985,347, filed May 21, 2018.

*Primary Examiner* — William H McCulloch, Jr.
(74) *Attorney, Agent, or Firm* — Knobbe, Martens, Olson & Bear, LLP

(57) ABSTRACT

Systems described herein may automatically and dynamically adjust the amount and type of computing resources usable to execute, process, or perform various tasks associated with a video game. Using one or more machine learning algorithms, a prediction model can be generated that uses the historical and/or current user interaction data obtained by monitoring the users playing the video game. Based on the historical and/or current user interaction data, future user interactions likely to be performed in the future can be predicted. Using the predictions of the users' future interactions, the amount and type of computing resources maintained in the systems can be adjusted such that a proper balance between reducing the consumption of computing resources and reducing the latency experienced by the users of the video game is achieved and maintained.

20 Claims, 12 Drawing Sheets

(56) References Cited

U.S. PATENT DOCUMENTS

| | | | |
|---|---|---|---|
| 10,091,281 B1* | 10/2018 | Lockhart | H04L 67/1023 |
| 10,286,322 B1* | 5/2019 | Wakeford | A63F 13/285 |
| 10,300,379 B1* | 5/2019 | Wakeford | A63F 13/335 |
| 10,357,718 B2* | 7/2019 | Aghdaie | A63F 13/67 |
| 10,535,174 B1* | 1/2020 | Rigiroli | G06T 13/40 |
| 10,576,379 B1* | 3/2020 | Wakeford | A63F 13/73 |
| 10,576,380 B1* | 3/2020 | Beltran | A63F 13/67 |
| 10,643,593 B1* | 5/2020 | Kolen | G10H 1/0066 |
| 10,741,143 B2* | 8/2020 | Dimitrov | G06T 3/0093 |
| 10,765,944 B2* | 9/2020 | Dantas de Castro | A63F 13/52 |
| 2006/0246972 A1 | 11/2006 | Thomas et al. | |
| 2007/0078918 A1* | 4/2007 | Nagasaka | G06T 17/10 |
| | | | 708/200 |
| 2007/0298886 A1 | 12/2007 | Aguilar, Jr. | |
| 2014/0274297 A1 | 9/2014 | Lewis et al. | |
| 2018/0243656 A1* | 8/2018 | Aghdaie | A63F 13/67 |
| 2019/0354759 A1* | 11/2019 | Somers | G06N 20/00 |
| 2020/0289925 A1* | 9/2020 | Norton | G06F 16/9535 |
| 2020/0294299 A1* | 9/2020 | Rigiroli | G06N 3/04 |

\* cited by examiner

PREDICTIVE EXECUTION OF DISTRIBUTED GAME ENGINES

BACKGROUND

Software developers typically desire for their software to provide a smooth user experience without unwanted latency. If a user experiences an unreasonably long load time every time he or she interacts with another object or player in the game, the user may become frustrated with the game and may never play the game again. Thus, one of the challenges of game development is to design a game that will provide a smooth user experience without noticeable delays during gameplay.

SUMMARY OF EMBODIMENTS

The systems, methods and devices of this disclosure each have several innovative aspects, no single one of which is solely responsible for all of the desirable attributes disclosed herein. Details of one or more implementations of the subject matter described in this specification are set forth in the accompanying drawings and the description below.

Certain aspects of the present disclosure relate to a computer-implemented method that may be implemented by an interactive computing system comprising one or more processors and configured with specific computer-executable instructions. The computer-implemented method may comprise: causing a set of computing resources to be provided, the set of computing resources being usable to execute one or more tasks within a video game in response to user interactions associated with a plurality of users interacting with the video game; receiving user interaction data indicative of a set of user interactions associated with one or more of the plurality of users; using a first prediction model, determining a set of predicted user interactions based at least on the user interaction data; determining, based at least on the set of predicted user interactions, a set of predicted computing resources to perform tasks triggered by the set of predicted user interactions; causing the set of computing resources to be adjusted based at least on the set of predicted computing resources; and performing one or more tasks triggered by user interactions with the video game using the adjusted set of computing resources.

The method of the preceding paragraph can include any combination or sub-combination of the following features: where the method further includes generating the first prediction model at least by accessing first user interaction data indicative of a first set of user interactions associated with two or more users of the plurality of users, where at least some of the user interactions in the first set are performed by the same user, and using one or more machine learning algorithms to determine the first prediction model based at least on the first user interaction data; where the set of predicted computing resources is determined using a second prediction model different from the first prediction model; where the method further includes generating the second prediction model at least by accessing (i) second user interaction data indicative of a second set of user interactions associated with two or more users of the plurality of users and (ii) computing resource data indicative of a first set of computing resources, and using one or more machine learning algorithms to determine the second prediction model based at least on the second user interaction data and the computing resource data; where the one or more tasks comprise one or more of collision detection, ray tracing, image rendering, special effects generation, animation generation, speech content generation, text content generation, haptic content generation, and physics simulation; where the set of predicted computing resources comprises a number of virtual machine instances to be acquired for processing the tasks triggered by the set of predicted user interactions; where the set of predicted computing resources comprises a number of microservices to be loaded onto one or more virtual machine instances or virtual containers, where the microservices are configured to execute tasks to be triggered by performance of the set of predicted user interactions; where the set of predicted computing resources comprises a set of files to be loaded onto one or more virtual machine instances or virtual containers for use by one or more microservices configured to execute tasks to be triggered by performance of the set of predicted user interactions; where the method further includes receiving additional user interaction data indicative of a set of additional user interactions associated with one or more of the plurality of users interacting with the video game, and further adjusting the adjusted set of computing resources based at least on the additional user interaction data; where the number of users in the plurality of users interacting with the game simultaneously is in the order of hundreds of thousands of users or greater; where the second prediction model comprises a mapping table associating one or more user interactions to one or more microservices to be executed to provide corresponding virtual user experiences in response to the one or more user interactions; and where the method further includes determining one or more latency values associated with a type of user interaction in the video game, and based at least on the one or more latency values, modifying the second prediction model such that the modified second prediction model would cause a greater amount of computing resources to be provisioned for the type of user interaction than the second prediction model prior to the modification.

Additional aspects of the disclosure provide a system that comprises an electronic data store configured to store user interaction data associated with a video game, and a hardware processor in communication with the electronic data store. The hardware processor may be configured to execute specific computer-executable instructions to at least: cause a set of computing resources to be provided, the set of computing resources being usable to execute one or more tasks within the video game in response to specific user interactions associated with a plurality of users interacting with the video game; receive user interaction data indicative of a set of user interactions associated with one or more of the plurality of users; using a first prediction model, determine a set of predicted user interactions based at least on the user interaction data; determine, based at least on the set of predicted user interactions, a set of predicted computing resources to perform tasks triggered by the set of predicted user interactions; cause the set of computing resources to be adjusted based at least on the set of predicted computing resources; and cause the adjusted set of computing resources to perform one or more tasks triggered by user interactions with the video game.

The system of the preceding paragraph can include any combination or sub-combination of the following features: where the set of predicted computing resources comprises a combination of a number of virtual machine instances to be acquired for processing the tasks triggered by the set of predicted user interactions and a number of microservices to be loaded onto one or more of such virtual machine instances or virtual containers created thereon, where the hardware processor is further configured to execute the specific computer-executable instructions to receive additional user interaction data indicative of a set of additional user interactions associated with one or more of the plurality of users interacting with the video game, and cause the adjusted set of computing resources to be further adjusted based at least on the additional user interaction data; where the hardware processor is further configured to execute the specific computer-executable instructions to determine one or more latency values associated with a type of user interaction in the video game, and based at least on the one or more latency values, modify the second prediction model such that the modified second prediction model would cause a greater amount of computing resources to be provisioned for the type of user interaction than the second prediction model prior to the modification.

Yet additional aspects of the disclosure provide non-transitory physical computer storage storing specific computer-executable instructions that, when executed by one or more hardware computing devices, cause the hardware computing devices to at least: cause a set of computing resources to be provided, the set of computing resources being usable to execute one or more tasks within a video game in response to specific user interactions associated with a plurality of users interacting with the video game; receive user interaction data indicative of a set of user interactions associated with one or more of the plurality of users; using a first prediction model, determine a set of predicted user interactions based at least on the user interaction data; determine, based at least on the set of predicted user interactions, a set of predicted computing resources to perform tasks triggered by the set of predicted user interactions; cause the set of computing resources to be adjusted based at least on the set of predicted computing resources; and cause the adjusted set of computing resources to perform one or more tasks triggered by user interactions with the video game.

The non-transitory physical computer storage of the preceding paragraph can include any combination or sub-combination of the following features: where the set of predicted computing resources comprises a combination of a number of virtual machine instances to be acquired for processing the tasks triggered by the set of predicted user interactions and a number of microservices to be loaded onto one or more of such virtual machine instances or virtual containers created thereon; where the specific computer-executable instructions further cause the one or more hardware computing devices to receive additional user interaction data indicative of a set of additional user interactions associated with one or more of the plurality of users interacting with the video game, and cause the adjusted set of computing resources to be further adjusted based at least on the additional user interaction data; where the specific computer-executable instructions further cause the one or more hardware computing devices to determine one or more latency values associated with a type of user interaction in the video game, and based at least on the one or more latency values, modify the second prediction model such that the modified second prediction model would cause a greater amount of computing resources to be provisioned for the type of user interaction than the second prediction model prior to the modification.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF EMBODIMENTS

Introduction

Figure 1A:
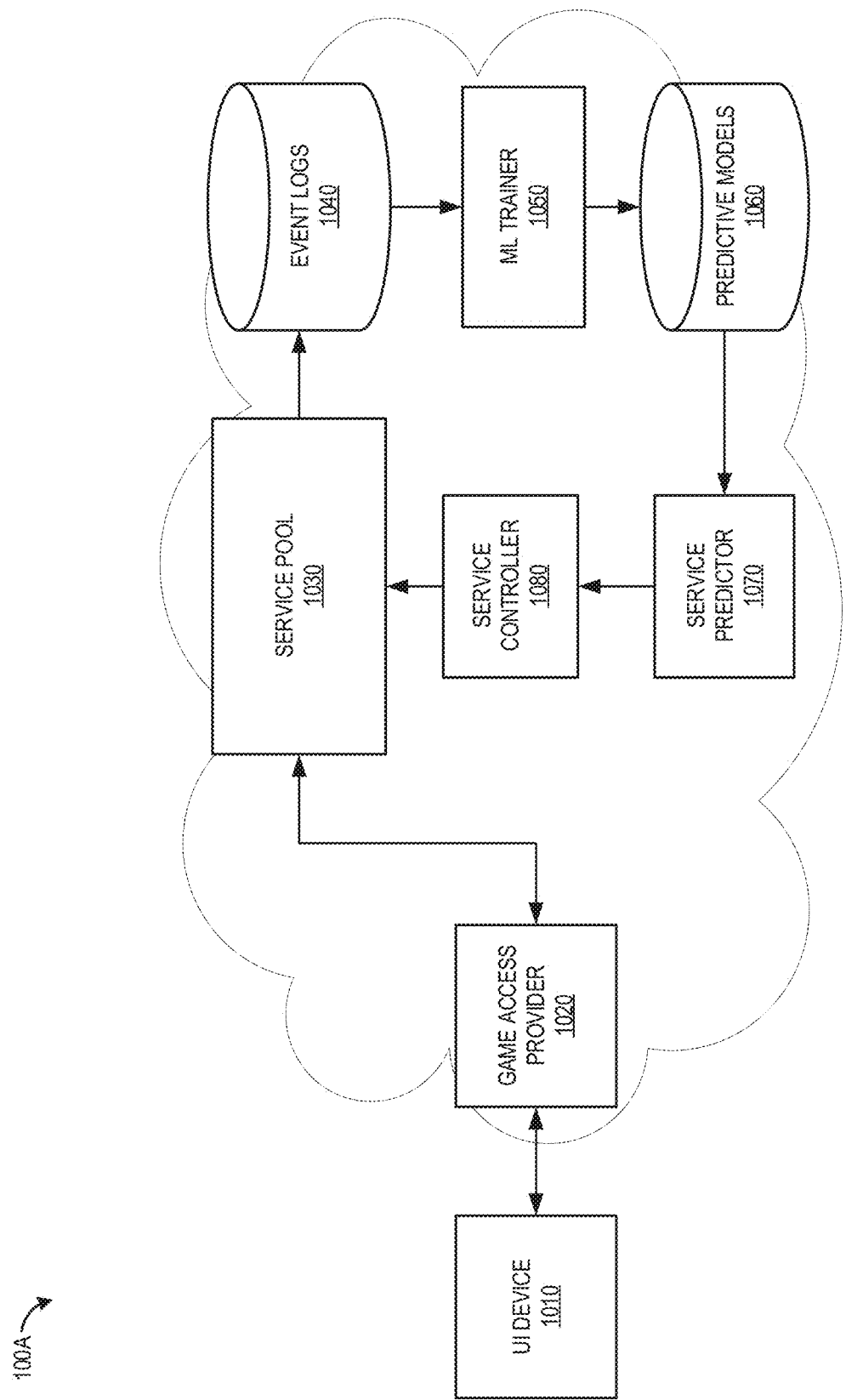
FIG. 1A illustrates a conceptual diagram of an embodiment of a predictive video game resource adjustment system.

Multiplayer video games allow many users to interact with each other in the same virtual world and perform various tasks together in the virtual world. Such video games are typically hosted on one or more dedicated servers, and the users access the various features of the games over a network. The dedicated servers may include a large number of service providers and data sources. The services may include physics simulators, non-player character (NPC) control, dialogue generation, and the like. The data may include game state, player preferences, and the like.

Preparing these services and data on demand in response to player actions can introduce unwanted latency if the corresponding processes or data need to be loaded or configured after the player performs such actions. Thus, the hardware capabilities of the servers may dictate the gaming experience provided to the users, for example, from the maximum number of users allowed to log onto the dedicated servers and play with each other, to the latency experienced by the users during gameplay. However, simply acquiring more robust servers and having more processes running at all times may be too expensive, since these computing resources may be severely under-utilized outside the peak times. Thus, an improved gaming platform that can reduce the latency experienced by the users while achieving satisfactory resource utilization is desired.

Embodiments disclosed herein can anticipate player actions and prepare the services and data so that the services and data for most likely player actions are ready prior to such player actions being performed, or the services and/or data being requested. For example, there may be 20 NPCs in a room. Rather than loading each of them (or the microservices needed for the NPC) as the player initiates conversations, the system can load up a small number of the NPCs (or the microservices needed for these NPCs) based upon the player state and historical preferences from the player and others.

Embodiments disclosed herein can predict the amount and type of computing resources needed or desired to be maintained on a gaming platform in order to provide seamless virtual user experiences to the individual users playing a video game. The prediction can be based on the number of users currently playing the video game and/or the history of user interactions performed by the users in the video game. Based on the prediction, the gaming platform can acquire additional computing resources if the currently maintained amount is expected to be insufficient to execute, process, or perform the tasks triggered by the future user interactions. By doing so, unnecessary delays associated with acquiring additional resources can be avoided or reduced. Alternatively, the gaming platform can remove some of the existing computing resources if the currently maintained amount is expected to be excessive. By doing so, unnecessary resource consumption can be avoided or reduced.

Systems disclosed herein can scale up or down the various services and microservices (sometimes collectively referred to herein as "microservices") depending on the current user interactions and/or expected user interactions. In some embodiments, the number of instances of the individual services and microservices can be adjusted in an attempt to change the latency experienced by the users playing the video game. By eliminating or reducing unnecessary delays experienced by the user during gameplay, the system can improve user satisfaction, and consequently, the retention rate for the users playing the video game. Additionally, by scaling the microservices down based on the predictions of the amount and type of computing resources expected to be needed or desired, the system can conserve valuable computing resources. As used herein, the phrase "microservices" may include applications, program codes, software modules, or any other services that can process and respond to requests from the UI device 1010 and/or the game access provider 1020 in FIG. 1A.

In some cases, a single instance within the video game is implemented on a monolithic server or implemented as a monolithic application. In other cases, a single instance within the video game is implemented across multiple servers, where each server may be running one or more microservices configured to execute, process, or perform the different tasks that provide the gameplay on the user device. For example, these microservices may include physics simulators, collision detectors, ray tracers, image renderers, special effects generators, animation generators, voice and text communication tools, and/or any other applications, modules, or codes that can calculate, generate, convert, and/or determine data needed to provide the in-game experience on the user device (e.g. audio, visual, text, and/or haptic content).

In some embodiments, the microservices may facilitate different execution of different portions of a video game. For example, text or speech generated by an NPC may be obtained from a microservice called or otherwise interfaced with by the software code that defines the NPC. As another example, an auction house feature of a video game may be managed by another microservice. Each of these microservices may be managed, hosted, and/or executed on a different host or server than a server or client that executes or hosts the video game or other portions of the video game.

Such microservices can be executed on a per-request basis using dedicated private servers and/or cloud computing service providers such as Amazon Web Services®, Google Cloud™, Microsoft Azure®, and the like. For example, upon receiving a user request to enter a new part of the in-game world, the system may identify the set of microservices needed to render the new part of the in-game world on the user's device and generate and send an appropriate request to each of the set of microservices pre-loaded and available on one or more virtual machine instances in the cloud.

As mentioned above, the system may not be able to have all the resources loaded at all times due to limited computing resources (for example, processing power, disk space, memory, etc.). The system may need to be selective in acquiring the right resources at the right time. For example, the system may need to make sure that a particular set of textures are located or stored in a particular container for the rendering microservice to access at a particular time.

For example, when player A talks to NPC X, the system may send a request to one instance of microservice M, which may take 0.1 seconds to generate a response based on the state of player A and send the response to the UI device of player A. If player B talks to NPC X while microservice M is generating a response for player A, the system may send a request to another instance of microservice M, which would then generate a response based on the state of player B and send the response to the UI device of player B. After the instance of microservice M finishes generating the response for player A, it can process another request. However, if additional players talk to NPC X while all of the instances of microservice M are occupied, the system may need to instantiate another instance of microservice M, which may take 5 seconds to be loaded and ready to go.

Thus, in order to provide a smooth virtual user experience, in some embodiments, the system tries to minimize or reduce the situations in which the player is waiting for a microservice to be loaded and become ready for execution by, for example, pre-instantiating sufficient instances of the microservice to support a predicted number of users interacting with the NPC X at a particular time.

FIG. 1A illustrates a conceptual diagram of an embodiment of a gaming environment 100A according to certain embodiments described herein. The gaming environment 100A includes UI device 1010, game access provider 1020, service pool 1030, event logs 1040, machine learning (ML) trainer 1050, predictive models 1060, service predictor 1070, and service controller 1080.

The UI device 1010 may include any type of computing device(s), such as desktops, laptops, video game platforms, television set-top boxes, televisions (for example, Internet TVs), network-enabled kiosks, car-console devices, computerized appliances, wearable devices (for example, smart watches and glasses with computing functionality), and wireless mobile devices (for example, smart phones, PDAs, tablets, or the like), to name a few. The UI device 1010 may be a thin client with controllers but limited storage and/or processing power such as a TV with a controller, or a tablet computer. Alternatively, the UI device 1010 may be a more robust device such as a desktop computer.

The game access provider 1020 may be a server that can receive, generate, and/or route requests to the service pool 1030 based on the information received from the UI device 1010, and receive, generate, and/or route requests to the UI device 1010 based on the information received from the service pool 1030. Based on user interactions performed by a user during gameplay (for example, the user initiates a conversation with an NPC), the game access provider 1020 may cause certain microservices in the service pool 1030 to be executed, and relay the execution results back to the UI device 1010 (for example, an audio and/or text message from the NPC to the user).

The service pool 1030 includes any servers, virtual machines, microservices, data, and/or other computing resources needed or desired to generate responses to the user interactions performed by the users playing the video game (sometimes collectively referred to herein as "computing resources"). In the example above, when the service pool 1030 receives a request to generate the audio message to be played on the UI device 1010 in response to the user initiating a conversation with the NPC, the request may be processed by a microservice loaded onto a virtual machine and ready for execution, where the microservice is configured to generate such audio messages based on user data (for example, the identity of the user's in-game playable character). In some cases, if all instances of the microservice are busy processing other requests, another instance of the microservice may need to be instantiated in the service pool 1030, and appropriate user data may need to be retrieved. In other cases, if one of the instances of the microservice is idle and the user data has already been retrieved and placed in the proper location in the service pool 1030 prior to the request, the request can be processed right away without any unnecessary delay.

The event logs 1040 may keep track of the events occurring in the video game and any performance data associated with the events. For example, the event logs 1040 may include data indicative of which user performed which interactions, which user interactions led to which other user interactions, which user interactions needed which microservices to be executed with which data, how many user interactions (or tasks associated with them) were processed by each microservice per second/minute/hour), how long did it take to generate and transmit a response to the UI device 1010 for each user interaction, and the like. As used herein, the phrase "task" refers to any computing task or gaming task that is performed on the user computing system 110, on the interactive computing system 130, or on both systems in a distributed manner. For example, the tasks triggered by the user initiating a conversation with an NPC in the video game 112 may include outputting an audio (for example, speech) or text response by the NPC and displaying an animation of the NPC's gestures. As another example, the tasks triggered by the user entering a new dungeon may be displaying a map of the dungeon, displaying the NPCs in the dungeon, and changing the background music.

Based on the information in the event logs 1040, the ML trainer 1050 can generate and/or modify the predictive models 1060 for predicting user interactions that will be performed in the future and the level of computing resources that will be needed in the future. The ML trainer 1050 can be trained with the goal of providing more accurate predictions of user interactions, resource needs, and timing, and/or reducing the latency associated with user interactions. For example, if the event logs 1040 indicate that when the user clicked on an NPC to talk to her, and the NPC's verbal message was outputted on the UI device 1010 after 2 seconds, this high latency value may indicate that the system did not have a sufficient number of instances of the microservice responsible for generating and providing the NPC's response to the user running in the service pool 1030.

Based on this indication, the ML trainer 1050 may update the predictive models 1060 such that the user interaction of talking to the NPC is more accurately predicted (for example, if the number of such user interactions was underestimated) and/or such that each predicted user interaction of talking to the NPC leads to a greater number of instances of the particular microservice being available in the service pool 1030 (for example, if the number of instances of the particular microservice was underestimated). Whether the number of user interactions was underestimated and/or whether the number of instances of the microservice was underestimated can be determined by comparing the predictions of the number of future user interactions to the number of user interactions actually performed, and by comparing the predictions of the number of instances of the microservice to the actual usage of the instances of the microservice, respectively.

The service predictor 1070 uses the predictive models 1060 to predict the level of computing resources. For example, the service predictor 1070 may predict how many servers are needed, how many virtual machines or containers are needed, how many of which microservices need to be loaded on which virtual machines or containers, what kind of data need to be loaded on which virtual machines or containers, and the like. In some cases, based on these predictions, program codes or data may be downloaded onto the UI device 1010. For example, if, based on the user's prior interactions, the user is expected to enter a new part of the world in 5 minutes and the new part of the world requires a large amount of map data to be downloaded on to the UI device 1010, the system may cause the map data to be downloaded in the background within the next 5 minutes such that when the user finally enters the new part of the world, the user does not need to wait for the map data to be downloaded.

The service controller 1080 determines, based on the prediction provided by the service predictor 1070, how to adjust the computing resources in the service pool 1030 such that the service pool 1030 contains a sufficient level of computing resources to execute, process, or perform the tasks triggered by the predicted number and type of user interactions at a given time. The service controller 1080 may act as a just-in-time inventory system, making sure the microservices and data are available and ready to be used at the right time.

To simplify discussion, the present disclosure is primarily described with respect to a video game. However, the present disclosure is not limited as such may be applied to other types of applications. For example, embodiments disclosed herein may be applied to educational applications or other applications that may be modified based on a history of user interactivity with the application. Further, the present disclosure is not limited with respect to the type of video game. The use of the term "video game" herein includes all types of games, including, but not limited to web-based games, console games, personal computer (PC) games, computer games, games for mobile devices (for example, smartphones, portable consoles, gaming machines, or wearable devices, such as virtual reality glasses, augmented reality glasses, or smart watches), or virtual reality games, as well as other types of games.

Example Networked Computing Environment

Figure 1B:
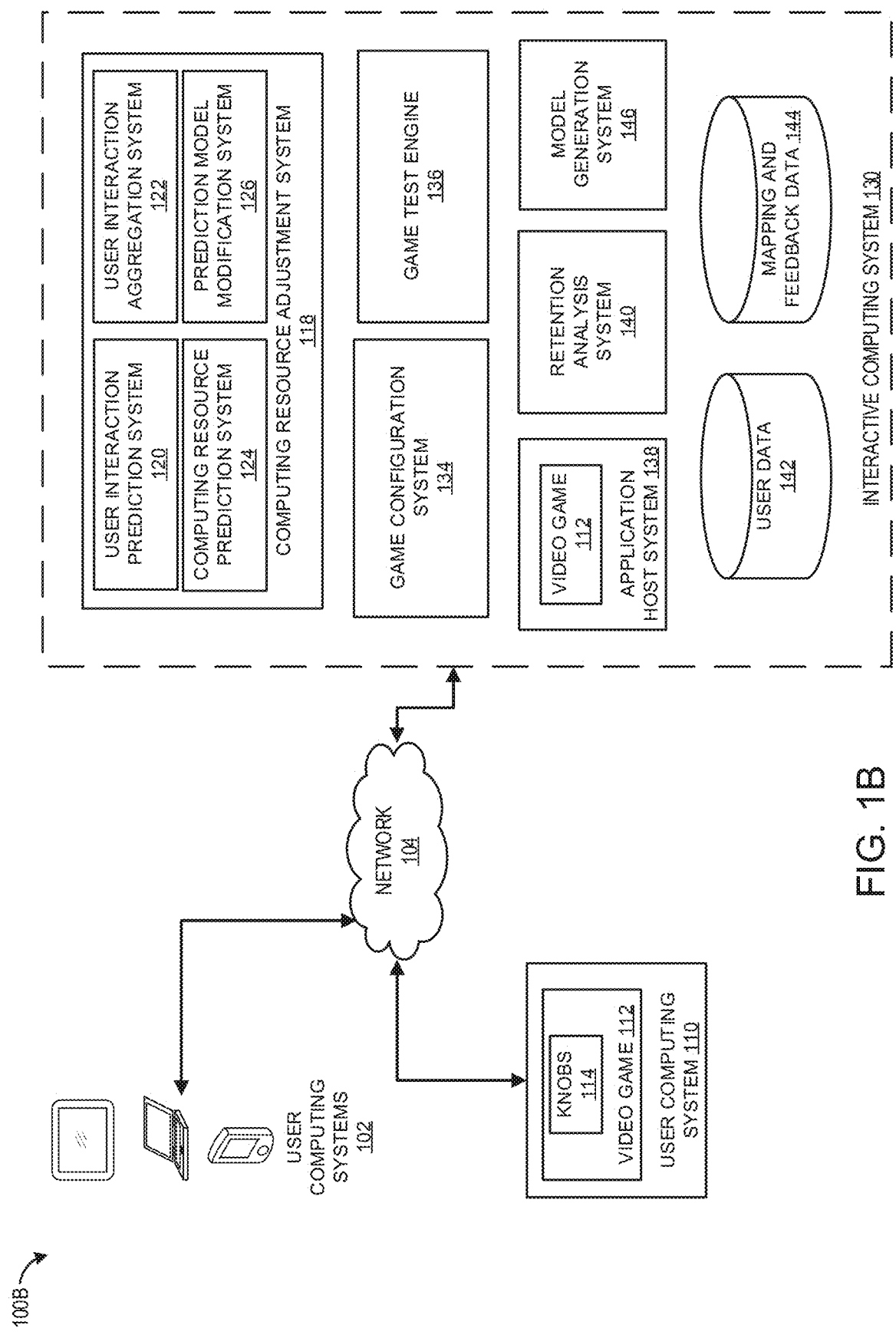
FIG. 1B illustrates an embodiment of a networked computing environment that can implement one or more embodiments of a predictive video game resource adjustment system.

FIG. 1B illustrates an embodiment of a networked computing environment 100B that can implement one or more embodiments of a predictive video game resource adjustment system. The networked computing environment 100B includes a user computing system 110 that can communicate with an interactive computing system 130 via a network 104. Further, the networked computing environment 100B may include a number of additional user computing systems 102. At least some of the user computing systems 102 may be configured the same as or similar to the user computing system 110.

User computing system 110 may include or host a video game 112. In some cases, the video game 112 may execute entirely on the user computing system 110. In other cases, the video game 112 may execute at least partially on the user computing system 110 and at least partially on the interactive computing system 130. In some cases, the video game 112 may execute entirely on the interactive computing system 130, but a user may interact with the video game 112 via the user computing system 110. For example, the game may be a massively multiplayer online role-playing game (MMORPG) that includes a client portion executed by the user computing system 110 and a server portion executed by one or more application host systems 138 that may be included as part of the interactive computing system 130. As another example, the video game 112 may be an adventure game played on the user computing system 110 without interacting with the interactive computing system 130.

Video game developers may wish to maintain or increase a user's level of engagement with the video game 112. One solution for maintaining or increasing the user's level of engagement with the video game 112 includes providing a smooth user experience without noticeable lag between the user interactions performed by the user and the in-game responses provided to the user in response to such user interactions. The interactive computing system 130 can predict the number and type of user interactions likely to be performed in the foreseeable future (for example, in the next minute, 2 minutes, 5 minutes, and the like), and adjust the currently maintained computing resources as needed, in order to ensure that a sufficient amount of computing resources are provisioned and ready to execute, process, or perform the tasks triggered by the user interactions. This determination or prediction of the future user interactions, as will be described in more detail below, may be made based at least in part on prior user interactions performed by the user playing the video game 112 and/or other users playing the video game 112.

Interactive computing system 130 may include a number of systems or subsystems for facilitating the prediction of user interactions to be performed in the future, the prediction of computing resources needed to process tasks triggered by such user interactions, and the adjustment of currently maintained computing resources to reach the predicted level of computing resources. These systems or subsystems can include a computing resource adjustment system 118, a game configuration system 134, a game test engine 136, an application host system 138, a retention analysis system 140, and a model generation system 146. Further, the interactive computing system 130 may include one or more repositories for storing data used to facilitate performing the processes described herein. These repositories may include a user data repository 142 and a mapping and feedback data repository 144. It should be understood that the interactive computing system 130 may include more or fewer repositories for the optimal storage and management of data used with the processes described herein.

Each of the aforementioned systems of the interactive computing system 130 may be implemented in hardware, and software, or a combination of hardware and software. Further, each of the systems may be implemented in a single computing system comprising computer hardware or in one or more separate or distributed computing systems. Moreover, while the systems are shown in FIG. 1B to be stored or executed on the interactive computing system 130, it is recognized that in some embodiments, part or all of the systems can be stored and executed on the user computing system 110.

In some embodiments, when the user computing system 110 is connected or in communication with the interactive computing system 130 via the network 104, the interactive computing system 130 may perform the processes described herein. However, in some cases where the user computing system 110 and the interactive computing system 130 are not in communication, the user computing system 110 may perform certain processes described herein using data stored at the user computing system 110.

The computing resource adjustment system 118 may include any system that can adjust the computing resources maintained in the interactive computing system based on certain information gathered from the user computing system 110 and/or information about the usage of the computing resources. In some embodiments, the computing resource adjustment system 118 may obtain, determine, and/or aggregate user interaction data, and provide the user interaction data to the retention analysis system 140 to determine or predict user satisfaction.

In some embodiments, the computing resource adjustment system 118 may pre-load a particular portion of the video game 112. For example, the computing resource adjustment system 118 may load particular maps, dungeons, in-game locations, NPCs, and the like. In some such examples, pre-loading the particular portion refers to preparing certain program codes for execution on the user computing system 110 and/or downloading certain data onto the user computing system 110 such that the latency associated with outputting data (for example, visual, sound, haptic, and the like) corresponding to the particular portion of the video game 112 via the user computing system 110 in response to a user interaction triggering such output is reduced.

In some other such examples, pre-loading the particular portion refers to preparing certain program codes for execution in the interactive computing system 130 (or another code execution environment) and/or downloading certain data onto a specific location in the user computing system 110 (or another code execution environment) such that the latency associated with outputting data (for example, visual, sound, haptic, and the like) corresponding to the particular portion of the video game 112 via the user computing system 110 in response to a user interaction triggering such output is reduced. The determination of portions of the video game 112 to load or pre-load and/or whether to load or pre-load such portions may be based on the location or state of user-playable characters within the video game 112.

In some embodiments, the computing resource adjustment system 118 may include a number of subsystems to facilitate predicting user interactions to be performed by the individual users playing the video game 112, aggregating the user interactions to determine the game-wide aggregate number and type of user interactions, predicting the amount and type of computing resources needed or desired to execute, process, or perform the tasks triggered by such user interactions, and/or adjust the prediction models after the fact as needed, based on additional information or feedback. The subsystems of the computing resource adjustment system 118 may include a user interaction prediction system 120, a user interaction aggregation system 122, a computing resource prediction system 124, and/or a prediction model modification system 126.

The user interaction prediction system 120 may include any system that can predict future user interactions that a user is likely to perform in the future, for example, based on the user's current state in the game and/or the user's prior interactions in the game. The prediction may be a probability distribution indicating the likelihood of the user performing various user interactions during gameplay. For example, the prediction may indicate that, based on the user having performed user interaction X in user state S, the probability that the user will perform user interaction Y within 1 minute is 12%, the probability that the user will perform user interaction Y between 1 to 2 minutes is 23%, the probability that the user will perform user interaction Y between 2 to 3 minutes is 6%, the probability that the user will perform user interaction Z within 1 minute is 8%, the probability that the user will perform user interaction Z between 1 to 2 minutes is 32%, the probability that the user will perform user interaction Z between 2 to 3 minutes is 9%, and so on.

The user interaction aggregation system 122 may include any system that aggregates the predictions of future user interactions determined by the user interaction prediction system 120. In some embodiments, the user interaction aggregation system 122 utilizes a prediction model to generate the aggregate values. In other embodiments, the user interaction aggregation system 122 sums all of the predictions to determine the aggregate values. For example, the aggregate values may indicate that the number of users expected to perform user interaction Y within 1 minute is 14.8, the number of users expected to perform user interaction Y between 1 to 2 minutes is 23.2, the number of users expected to perform user interaction Y between 2 to 3 minutes is 41.5, the number of users expected to perform user interaction Z in 1 minute is 41.8, the number of users expected to perform user interaction Z between 1 to 2 minutes is 62.2, the number of users expected to perform user interaction Z between 2 to 3 minutes is 51.5, and so on.

The computing resource prediction system 124 can include any system that can determine the amount and type of computing resources needed or desired to perform the tasks triggered by the predicted user interactions. The computing resource prediction system 124 may maintain a mapping table mapping the user interactions with the amount and type of computing resources. For example, based on such a mapping table, the computing resource prediction system 124 may determine that user interaction X triggers execution of microservice P with data A and microservice Q with model N. In one example, the prediction generated by the computing resource prediction system 124 may indicate that the number of instances of microservice P needed along with Data A in 1 minute is 5, the number of instances of microservice P needed along with Data A between 1 to 2 minutes is 4, the number of instances of microservice P needed along with Data A between 2 to 3 minutes is 3, the number of instances of microservice P needed along with Model M in 1 minute is 10, the number of instances of microservice P needed along with Model M between 1 to 2 minutes is 13, the number of instances of microservice P needed along with Model M between 2 to 3 minutes is 15, the number of instances of microservice Q needed along with Data B in 1 minute is 22, the number of instances of microservice Q needed along with Data B between 1 to 2 minutes is 24, the number of instances of microservice Q needed along with Data B between 2 to 3 minutes is 21, the number of instances of microservice Q needed along with Model N in 1 minute is 4, the number of instances of microservice Q needed along with Model N between 1 to 2 minutes is 1, the number of instances of microservice Q needed along with Model N between 2 to 3 minutes is 1, and so on.

The prediction model modification system 126 may include any system that can adjust the prediction models used to generate the predictions described herein. The prediction model modification system 126 may adjust the prediction models after the fact as needed, based on additional information or feedback. For example, based on the user interactions actually performed, the computing resources actually utilized, and/or any performance metrics indicative of the performance of the prediction models (for example, latency values associated with a user performing a user interaction and receiving an appropriate response thereto), the prediction model modification system 126 may update the prediction models such that the prediction of user interactions and/or the prediction of computing resources are improved. In some embodiments, data that would cause the prediction model modification system 126 to modify an existing prediction model is instead provided to the model generation system 146, and the model generation system 146 generates a new model based on the provided data.

The retention analysis system 140 can determine a predicted churn or retention rate for a user based on the latency (or other performance metrics) associated with the user interactions performed by the user playing the video game 112.

The game configuration system 134 can set or adjust the state or configuration of a video game 112. In some embodiments, the game configuration system 134 modifies an existing configuration of the video game 112. Setting or modifying the configuration of the video game 112 may include modifying or changing one or more portions of the video game 112 by adjusting one or more knobs 114 or state variables of the video game 112. In some embodiments, the video game 112 is modified so as to adjust the difficulty level of video game 112. In certain embodiments, the game configuration system 134 may adjust the gameplay experience of playing the video game 112 by modifying the sequence of stages within the game, items that are dropped during the game, the difficulty level of the game, non-playable characters (NPCs) that are encountered during the game, and any other features of the video game 112. In some embodiments, the game configuration system 134 may adjust the video game 112 by modifying seed values that are used to generate portions of the video game 112 or other aspects of the video game 112, such as item drop rates or enemy appearances. The game configuration system 134 may adjust seed values instead of, or in addition to, directly modifying state variables or knobs 114 of the video game 112.

The model generation system 146 can use one or more machine learning algorithms to generate one or more prediction models. One or more of these prediction models may be used to determine an expected value or occurrence based on a set of inputs. For example, a prediction model can be used to determine a probability that a user will perform one or more user interactions based on one or more inputs to the prediction model, such as, for example, historical user interaction data or the state of the user playing the video game 112. As another example, a prediction model can be used to determine or predict the amount and type of computing resources based on one or more data inputs to the prediction model, such as, for example, a prediction of the number and type of user interactions expected to be performed by the users game-wide. In some cases, the prediction model may be termed a prediction model because, for example, the output may be or may be related to a prediction of an action or event, such as the prediction the user performs one or more specific user interactions. A number of different types of algorithms may be used by the model generation system 146. For example, certain embodiments herein may use a logistical regression algorithm. However, other algorithms are possible, such as a linear regression algorithm, a discrete choice algorithm, or a generalized linear algorithm.

The machine learning algorithms can be configured to adaptively develop and update the prediction models over time based on new input received by the model generation system 146. For example, the models can be regenerated on a periodic basis as new user information (for example, additional user interaction data or feedback data such as latency) is available to help keep the predictions in the model more accurate as the user information evolves over time. The model generation system 146 is described in more detail herein. After a model is generated, the model can be provided to the retention analysis system 140. Although the prediction model modification system 126 is illustrated as a component separate from the model generation system 146 in FIG. 1B, in some other embodiments, the interactive computing system 130 may not include the prediction model modification system 126 and the model generation system 146 may instead perform the techniques described herein as being performed by the prediction model modification system 126.

Some non-limiting examples of machine learning algorithms that can be used to generate and update the prediction models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

The game test engine 136 can include any system that can perform testing of the video game 112 to determine the impact on changes to the video game 112. While the game test engine 136 can often be used to detect the existence of bugs or errors in the development of the video game 112, embodiments disclosed herein enable the game test engine 136 to determine the impact of the latency between user interactions and responses thereto. Thus, for example, the game test engine 136 may cause one version of the video game 112 to be presented to a first set of users based on one set of prediction models, and another version of the video game 112 to be presented to a second set of users based on another set of prediction models. The presentation of different versions of the video game 112 to different sets of users may be referred to as A/B testing. By doing so, the game test engine 136 can determine a version of the video game 112 that is more likely to cause a greater number of users to experience a smooth gameplay without unnecessary lag.

The mapping and feedback data repository 144 can include one or more mappings between the number and type of user interactions and the amount and type of computing resources needed or desired to execute, process, or perform the tasks triggered by such user interactions. For example, one mapping may indicate that entering dungeon X requires microservices A and B to be executed using data P and Q, respectively. The mapping and feedback data repository 144 may further include timing data indicative of the time it takes for a given microservice to begin and complete execution. For example, the timing data may indicate that microservice A takes 0.1 seconds to execute, and microservice B takes 0.5 seconds to execute. The computing resource prediction system 124 may utilize the mapping data and the timing data to determine, for example, how many instances of microservices A and B need to be available in the interactive computing system 130 when 150 users are expected to enter dungeon X between 12:00 am and 12:05 am.

The mapping and feedback data repository 144 may further include latency data indicative of the latency between the performance of a given user interaction on a user computing system 110 and the presentation of a response to the given user interaction on the user computing system 110. For example, the latency data may indicate the amount of time elapsed between the user requesting to enter dungeon X and the dungeon X being presented on the screen of the user computing system 110. The mapping and feedback data repository 144 may further include usage data indicative of the actual usage of the computing resources provisioned in the interactive computing system 130. The latency data and the usage data can be used by the prediction model modification system 126 to improve the prediction models for predicting the expected amount and type of computing resources needed. By doing so, computing resource consumption can be reduced in the event that computing resources are being under-utilized, and latency can be reduced in the event that computing resources are being under-provisioned.

The user data repository 142 can store user interaction data indicative the user interactions performed by the individual users playing the video game 112. The user interaction data can be used by the prediction model modification system 126 to improve the prediction models for predicting the expected user interactions to be performed by the users playing the video game 112. Since the prediction of user interactions is used to predict the amount and type of computing resources to maintain in the interactive computing system 130 in some embodiments, by doing so, computing resource consumption can be reduced in the event that computing resources are being under-utilized based on an overestimation of the expected user interactions, and latency can be reduced in the event that computing resources are being under-provisioned based on an underestimation of the expected user interactions.

As previously described, in some embodiments, the video game 112, or a portion thereof, may be hosted by an application host system 138 of the interactive computing system 130. For example, a MMORPG may have a portion executed or hosted on the user computing system 110 and a portion executed or hosted on an application host system 138 of the interactive computing system 130. In some such embodiments, the game configuration system 134 may modify the state of the video game 112 by modifying knobs, state variables, or features of the video game 112 hosted at the user computing system 110 and/or the application host system 138.

The network 104 can include any type of communication network. For example, the network 104 can include one or more of a wide area network (WAN), a local area network (LAN), a cellular network, an ad hoc network, a satellite network, a wired network, a wireless network, and so forth. Further, in some cases, the network 104 can include the Internet. In certain embodiments, one or more elements of the interactive computing system 130 may be combined or further separated among one or more computing systems.

The video game 112 may include a number of knobs 114 that modify or affect the state of the video game 112. Typically, the knobs 114 are variables that affect the execution or operation of the video game 112. In some cases, the knobs 114 are state variables that directly modify the execution of the video game 112. In other cases, the knobs 114 are seeds or seed variables that may alter the probability of an occurrence within the video game 112 or a random (or pseudorandom) configuration or event within the video game 112. For example, one seed may correspond to and may impact the generation of a level layout in the video game 112. As another example, one seed may correspond to and impact the number of occurrences of item drops or the types of items dropped as a user plays the video game 112. In some cases, the seed value is a value that initializes or influences a random or pseudorandom number generator. In some such cases, the random number generated based on the seed value may be utilized by one or more functions of the video game 112 to influence the operation of the video game 112. In some cases, the seed variables may be referred to as levers, and the seed variables are non-limiting examples of various types of knobs. It should be understood that the knobs 114, sometimes referred to as levers or state variables, are not limited to seeds, but can include any type of variable that may modify execution of the video game 112. The system may modify execution of the video game by adjusting any type of knob or lever that can change the video game 112.

The user computing system 110 may include hardware and software components for establishing communications over a communication network 104. For example, the user computing system 110 may be equipped with networking equipment and network software applications (for example, a web browser) that facilitate communications via a network (for example, the Internet) or an intranet. The user computing system 110 may have varied local computing resources, such as central processing units and architectures, memory, mass storage, graphics processing units, communication network availability and bandwidth, and so forth. Further, the user computing system 110 may include any type of computing system. For example, the user computing system 110 may include any type of computing device(s), such as desktops, laptops, video game platforms, television set-top boxes, televisions (for example, Internet TVs), network-enabled kiosks, car-console devices, computerized appliances, wearable devices (for example, smart watches and glasses with computing functionality), and wireless mobile devices (for example, smart phones, PDAs, tablets, or the like), to name a few. In some embodiments, the user computing system 110 may include one or more of the embodiments described below with respect to FIGS. 8 and 9.

Example Model Generation System

Figure 1C:
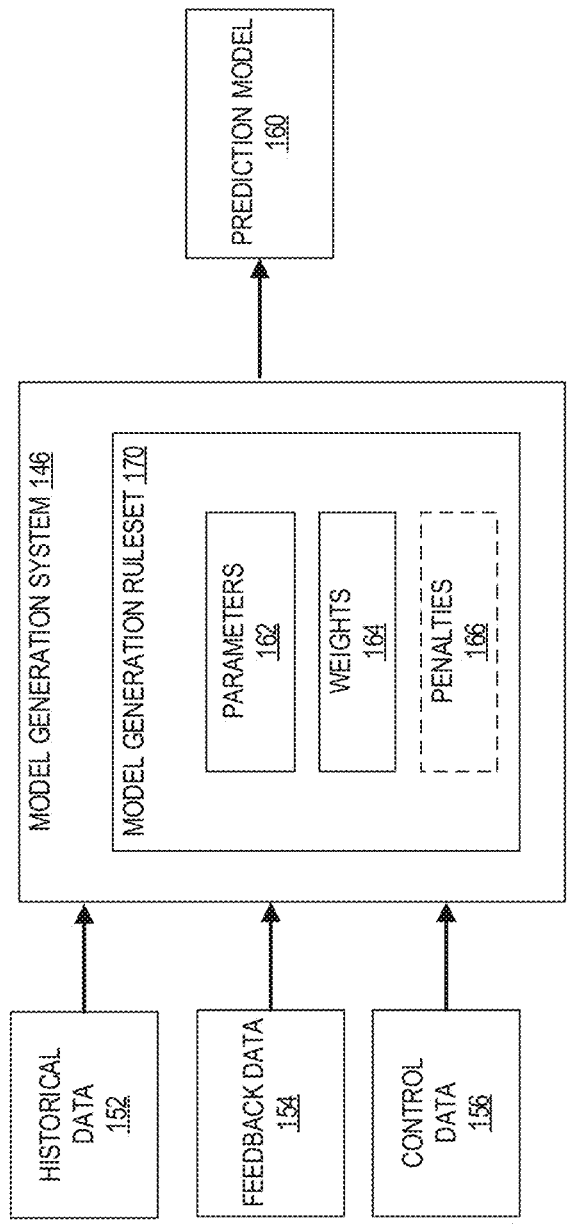
FIG. 1C illustrates an embodiment of a model generation system of FIG. 1B.

FIG. 1C illustrates an embodiment of the model generation system 146 of FIG. 1B. The model generation system 146 may be used to determine one or more prediction models 160 based on historical data 152 for a number of users. Typically, although not necessarily, the historical data 152 includes data associated with a large number of users, such as hundreds, thousands, hundreds of thousands, millions, or more users. However, the present disclosure is not limited as such, and the number of users may include any number of users. Further, the historical data 152 can include data received from one or more data sources, such as, for example, an application host system (not shown) and/or one or more user computing systems 102. In some embodiments, the historical data 152 may include a very large number of data points, such as millions of data points, which may be aggregated into one or more data sets. In some cases, the historical data 152 may be accessed from the user data repository 142. In some embodiments, the historical data 152 is limited to historical information about a particular video game 112, but in other embodiments, the historical data 152 may include information from one or more other video games. In some cases, the other video games are similar (for example, the same genre, the same theme, the same or similar types of objectives, and the like). In other cases, the video games that provide the historical data 152 are not limited in type or similarity. Further, in some embodiments, one or more subsets of the historical data 152 may be limited by a date restriction, such as for example, limited to include only data from the last 6 months, data that is between 3-6 months old, or data less than a year old.

The historical data 152 may include user interactions performed by the individual users playing the video game 112 as well as the sequence of user interactions. For example, one data point in the historical data 152 may indicate that user X performed user interactions A, B, and C in that sequence. As another example, the historical data 152 may indicate, for each user interaction, a previous user interaction that precedes the user interaction and a subsequent user interaction that follows the user interaction.

In some embodiments, the phrase "user interaction" as used herein refers to a particular action performed by the user (or an in-game character controlled by the user). In other embodiments, the phrase "user interaction" as used herein refers to a combination of a particular action performed by the user (or an in-game character controlled by the user) and the state in which the user performed the particular action. The user interactions described herein may belong to one of a plurality of levels of granularity. In some embodiments, a user interaction comprises a single interaction with the video game 112 such as a button press, a mouse click, a mouse scroll, a key press, a single interaction with a touchscreen interface, and so on. In other embodiments, a user interaction comprises a single in-game action or task such as speak to NPC A, speak to NPC B, fight monster C, sell item D, and so on. In yet other embodiments, a user interaction comprises a single group of in-game actions, tasks, and/or states such as defeating bosses X and Y, collecting all of items P, Q, and R, and so on. In some embodiments, some or all user interactions belong to the same level of granularity. In other embodiments, some user interactions belong to one level of granularity, and other user interactions belong to another level of granularity.

The model generation system 146 may, in some cases, also receive feedback data 154. This data may be received as part of a supervised model generation process that enables a user, such as an administrator, to provide additional input to the model generation system 146 that may be used to facilitate generation of the prediction model 160. For example, if an anomaly exists in the historical data 152, the user may tag the anomalous data enabling the model generation system 146 to process the tagged data differently, such as by applying a different weight to the data or excluding the data from the model generation process.

Further, the model generation system 146 may receive control data 156. This control data 156 may identify one or more features or characteristics for which the model generation system 146 is to determine a model. Further, in some cases, the control data 156 may indicate a value for the one or more features identified in the control data 156. For example, suppose the control data 156 indicates that a prediction model is to be generated using the historical data 152 to determine a probability distribution of potential future user interactions likely to be performed by a user playing the video game 112. If the user interactions actually performed by the user is known, this data may be provided as part of the control data 156, or as part of the historical data 152. As another example, if the prediction model is to be generated to estimate a retention rate as determined, for example, based on whether the users played the video game 112 for a threshold period of time or continue to play the video game 112 after a particular threshold period of time, the control data 156 may include the retention rate for the users whose data is included in the historical data 152. As yet another example, if the prediction model is to be generated to estimate the amount and type of computing resources to be provisioned in view of the predicted number and type of user interactions to be performed in the video game 112, the control data 156 may include the actual usage of the computing resources in response to prior performance of such user interactions.

The model generation system 146 may generally include a model generation rule set 170 for generating the prediction model 160. The model generation rule set 170 may include one or more parameters 162. Each set of parameters 162 may be combined using one or more mathematical functions to obtain the prediction model 160. Further, one or more specific parameters may be weighted by the weights 164. In some cases, the prediction model may be obtained by combining a set of parameters with a respective set of weights 164. The prediction model 160 and/or the respective parameters 162 of the prediction models 160 may be derived during a training process based on particular input data, such as the historical data 152, feedback data 154, and control data 156, and defined output criteria, which may be included with the control data 156, used for training purposes. The model generation rule set 170 can define the specific machine learning rules and/or algorithms the model generation system 146 uses to generate the prediction model 160 based on a defined objective function, such as predicting the number and type of user interactions or predicting the amount and type of computing resources. In some embodiments, initial values of the parameters 162 and the weights 164 can be manually set during the initiation of the model generation process. The parameters 162 and the weights 164 can be updated and modified during the model generation phase to generate the prediction model 160.

The model generation system 146 can filter and categorize the historical data sets according to various characteristics and parameters of the data. For example, the data can be categorized by the data source (such as, for example, game application data, host application data, or user profile data), information type (such as, for example, gameplay information, transaction information, interaction information, game account information), or other categories associated with the data. The model generation system 146 can filter the information to identify the information for further processing. In some embodiments, the model generation system 146 is configured to filter and separate the historical data 152 into a plurality of data types or categories before further processing. Moreover, in some cases, some of the historical data 152 may be filtered out or removed from the historical data 152 based on the data being associated with a relevance that does not satisfy a threshold relevance as determined by the model generation system 146.

Optionally, one or more of the prediction models 160 may be associated with a penalty 166. These penalties 166 may be used to facilitate the generation or selection of a particular prediction model 160 based on one or more factors that are used to derive the penalty. For example, the mathematical complexity or the number of parameters included in a particular prediction model 160 may be used to generate a penalty for the particular prediction model 160, which may impact the generation of the model and/or a selection algorithm or a selection probability that the particular prediction model 160 is selected.

After the prediction model 160 has been generated, the model can be used during runtime of the retention analysis system 140 or the computing resource adjustment system 118 (or one or more components thereof) to generate one or more predictions described herein.

Example Computing Resource Adjustment System

Figure 1D:
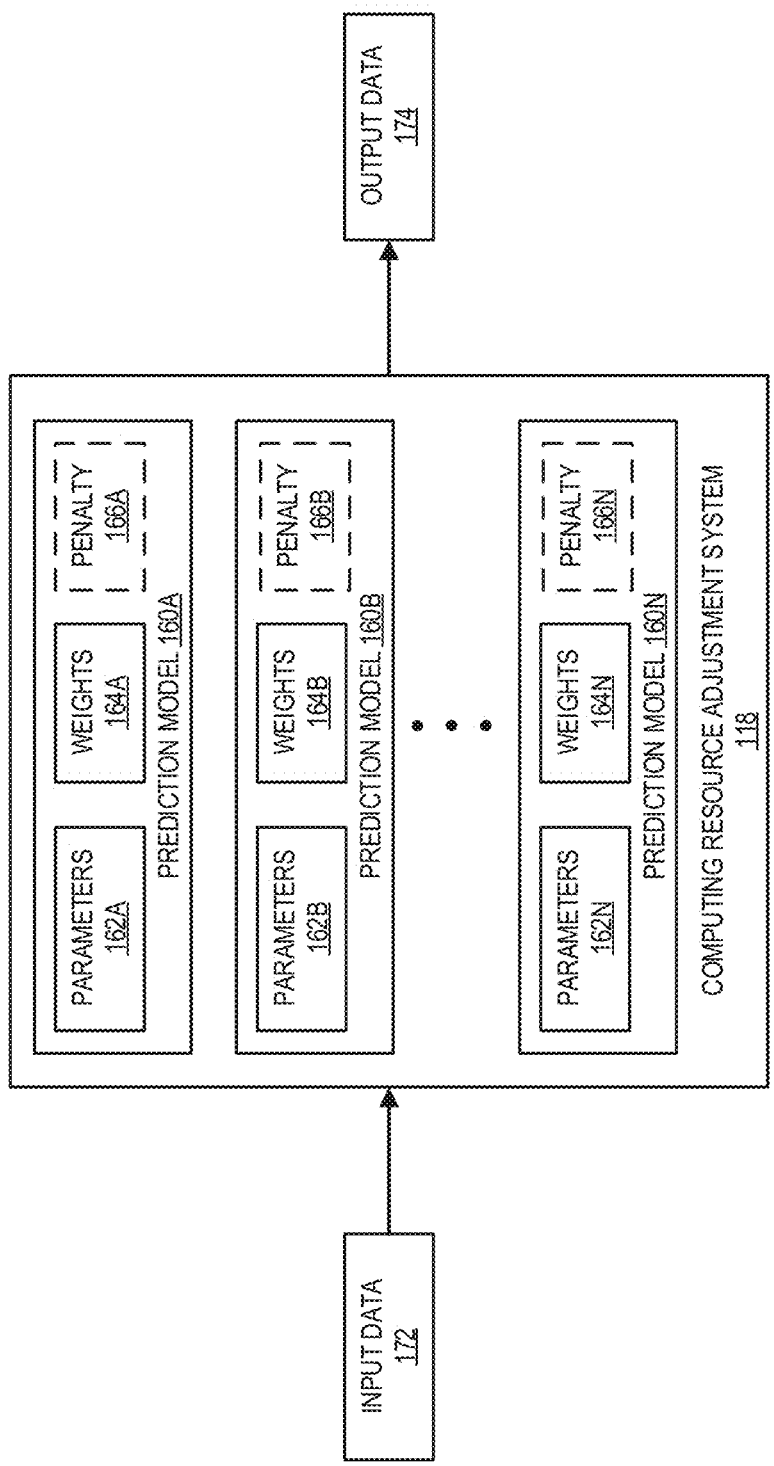
FIG. 1D illustrates an embodiment of a computing resource adjustment system of FIG. 1B.

FIG. 1D illustrates an embodiment of a computing resource adjustment system 118 of FIG. 1B. The computing resource adjustment system 118 can apply or use one or more of the prediction models 160 generated by the model generation system 146. The computing resource adjustment system 118 may use one or more prediction models 160A, 160B, 160N (which may be referred to collectively as "prediction models 160" or in the singular as "prediction model 160") to process the input data 172 to obtain the output data 174. The prediction models 160 may also be referred to as parameter functions or parameter models. Although the example of FIG. 1D illustrates the computing resource adjustment system 118, in other embodiments, any other component thereof may be used instead, such as the user interaction prediction system 120, the user interaction aggregation system 122, computing resource prediction system 124, and the prediction model modification system 126.

The computing resource adjustment system 118 may apply the prediction model(s) 160 during gameplay. In some embodiments, the prediction models 160 are applied continuously, repeatedly but not necessarily continuously, periodically, or at arbitrary time intervals, to determine the predicted user interactions likely to occur in the future and/or the predicted amount and/or type of computing resources likely to be needed in the future to execute, process, or perform one or more tasks triggered by such predicted future user interactions with the video game 112.

The computing resource adjustment system 118 receives input data 172 that can be applied to one or more of the prediction models 160. The input data 172 can include one or more pieces of user interaction data associated with one user who is playing or otherwise interacting with the video game 112. In some other cases, the input data 172 includes one or more pieces of user interaction data associated with multiple users who are playing or otherwise interacting with the video game 112. The user interaction data may include any type of data that indicates one or more in-game user interactions initiated by the user during gameplay such as, for example, entering a specific dungeon, initiating a conversation with an NPC, attacking another player, picking up an item, and the like. In some embodiments, the input data 172 can be filtered before it is provided to the computing resource adjustment system 118.

In some embodiments, a single prediction model 160 may exist for the computing resource adjustment system 118. However, as illustrated, it is possible for the computing resource adjustment system 118 to include multiple prediction models 160. For example, the computing resource adjustment system 118 may include some prediction models for estimating future user interactions likely to be performed by a user interacting with the video game 112 based on the user's prior user interactions, some prediction models for aggregating predictions of individual users' future user interactions; some prediction models for estimating future user interactions likely to be performed by multiple users interacting with the video game 112 based on the prior user interactions of the multiple users, and some prediction models for estimating the amount and type of computing resources likely to be needed to execute, process, or perform tasks triggered by user interactions occurring in the future.

The computing resource adjustment system 118 can determine which prediction model, such as any of models 160A-N, to use based on input data 172 and/or additional identifiers associated with the input data 172. Additionally, the selection of a prediction model 160 may be based on the specific input data 172 provided. The availability of particular types of data as part of the input data 172 can affect the selection of the prediction model 160. For example, the inclusion of demographic data (for example, age, gender, first language) as part of the input data may result in the use of prediction model 160A. However, if demographic data is not available for a particular user, then prediction model 160B may be used instead.

As mentioned above, one or more of the prediction models 160 may have been generated with or may be associated with a penalty 166. The penalty may be used to impact the generation of the model or the selection of a prediction model for use by the computing resource adjustment system 118.

In some cases, the output data 174 may be a prediction of future user interactions likely to be performed by a user interacting with the video game 112. In other cases, the output data 174 may be an aggregation of a multiple sets of predictions of future user interactions corresponding to multiple users interacting with the video game 112. In yet other cases, the output data 174 may be a prediction of a collective set of future user interactions likely to be performed by multiple users interacting with the video game 112. In yet other cases, the output data 174 may be a prediction of the amount and type of computing resources likely to be needed to execute, process, or perform tasks triggered by user interactions occurring in the future. In yet other cases, the output data 174 may be a confirmation that the computing resources have been adjusted.

In some embodiments, the computing resource adjustment system 118 uses a single prediction model 160 to generate the output data 174 based on the input data 172. In other embodiments, the computing resource adjustment system 118 uses two or more prediction models 160 in series to generate the output data 174 based on the input data 172. For example, the input data 172 may be inputted into one prediction model, and the output of the prediction model may be inputted into another prediction model, which outputs the output data 174. In yet other embodiments, the computing resource adjustment system 118 uses some prediction models in parallel and some other prediction models in series to generate the output data 174 based on the input data 172. For example, The prediction models 160A, 160B, 160N may generally include a set of one or more parameters 162A, 162B, 162N, respectively (which may be referred to collectively as "parameters 162"). Each set of parameters 162 (such as parameters 162A) may be combined using one or more mathematical functions to obtain a parameter function. Further, one or more specific parameters from the parameters 162A, 162B, 162N may be weighted by the weights 164A, 164B, 164N (which may be referred to collectively as "weights 164"). In some cases, the parameter function may be obtained by combining a set of parameters (such as the parameters 162A) with a respective set of weights 164 (such as the weights 164A). Optionally, one or more of the prediction models 160A, 160B, 160N may be associated with a penalty 166A, 166B, 166N, respectively (which may be referred to collectively as "penalties 166").

Example Prediction Model Generation Process

Figure 2:
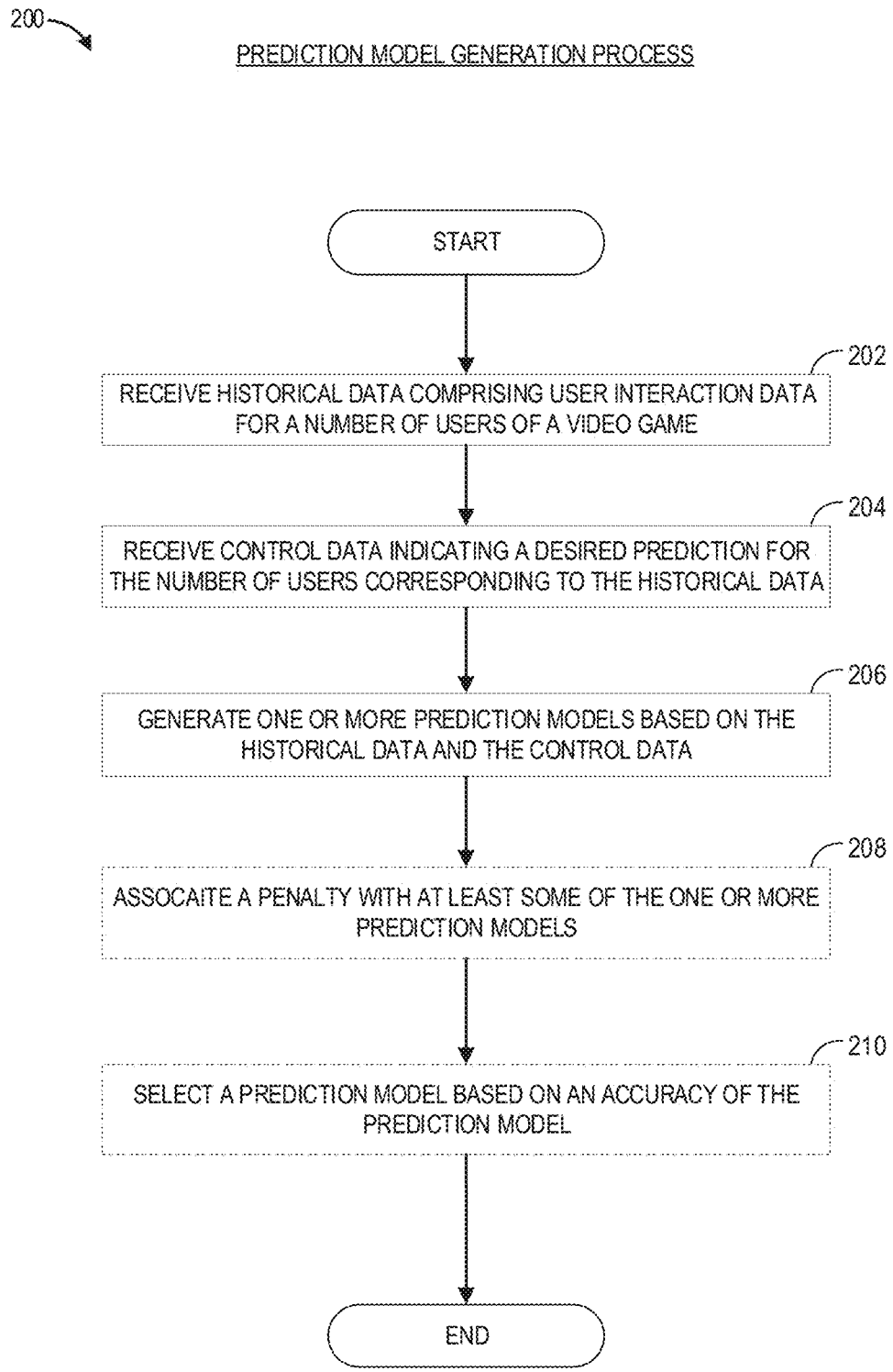
FIG. 2 presents a flowchart of an embodiment of a prediction model generation process.

FIG. 2 presents a flowchart of an embodiment of a machine learning or prediction model generation process 200. The process 200 can be implemented by any system that can generate one or more prediction models that include one or more parameters. In some cases, the process 200 serves as a training process for developing one or more prediction models or parameter functions based on historical data or other known data. The process 200, in whole or in part, can be implemented by, for example, an interactive computing system 130, a game configuration system 134, a retention analysis system 140, a model generation system 146, or a user computing system 110, among others. Although any number of systems, in whole or in part, can implement the process 200, to simplify discussion, the process 200 will be described as being performed by the model generation system 136. Further, it should be understood that the process 200 may be updated or performed repeatedly over time. For example, the process 200 may be repeated once per month, with the addition or release of a new video game, or with the addition of a threshold number of new users available for analysis or who are playing the video game 112. However, the process 200 may be performed more or less frequently.

At block 202, the model generation system 146 receives historical data 152 comprising user interaction data for a number of users of the video game 112. The user interaction data may include any type of data that indicates one or more in-game user interactions initiated by the user during gameplay such as, for example, entering a specific dungeon, initiating a conversation with an NPC, attacking another player, picking up an item, and the like. In some embodiments, a process described herein as being performed by the user is performed by an in-game character controlled by the user. In some other embodiments, a process described herein as being performed by the user is performed by the user computing system 110 controlled by the user.

The historical data 152 may serve as training data for the model generation system 146 and may include, in addition to the user interaction data, user demographics or characteristics, such as age, geographic location, gender, or socioeconomic class. In addition, the historical data 152 may include information relating to a play style of one or more users; the amount of money spent playing the video game 112; user success or failure information with respect to the video game 112 (for example, a user win ratio); a play frequency of playing the video game 112; a frequency of using particular optional game elements (for example, available boosts, level skips, in-game hints, power ups, and the like); the amount of real money (for example, U.S. dollars or European euros) spent purchasing in-game items for the video game 112; and the like. This additional historical data may be combined with or associated with the user interaction data that may be used to predict future interactions that may be performed by the user. Further, in some cases, the historical data 152 may include data related to the video game 112, such as one or more seed values used by users who played the video game 112. Additional examples of data related to the video game 112 that may be received as part of the historical data 152 may include settings for one or more knobs or state variables of the video game 112, the identity of one or more difficulty levels for the video game 112 used by the users, the type of the video game 112, and the like.

At block 204, the model generation system 146 receives control data 156 indicating a desired prediction for the number of users corresponding to the historical data. The control data 156 may indicate one or more features or characteristics for which the model generation system 146 is to determine a model. Alternatively, or in addition, the control data 156 may include a value for the features or characteristics that are associated with the received historical data 152.

For example, the control data 156 may identify certain user interactions as the desired feature to be predicted by the model that is to be generated by the model generation system 146. In this example, the historical data 152 may specify user interaction A (for example, entering a new dungeon), and the control data 156 may specify a probability distribution of user interactions X, Y, and Z (for example, initiating a conversation with the NPC sitting at the dungeon entrance, opening a chest next to the NPC, and attacking the first monster near the dungeon entrance, respectively) that are likely to follow user interaction A.

As another example, the control data 156 may identify the amount and type of computing resources as the desired feature to be predicted by the model that is to be generated by the model generation system 146. In this example, the historical data 152 may specify user interaction B (for example, initiating a conversation with an NPC), and the control data 156 may specify microservices P and Q (for example, NPC speech generator and NPC animation generator, respectively) that are needed to execute, process, or perform the tasks triggered by user interaction B.

At block 206, the model generation system 146 generates one or more prediction models 160 based on the historical data 152 and the control data 156. The prediction models 160 may include one or more variables or parameters 162 that can be combined using a mathematical algorithm or model generation ruleset 170 to generate a prediction model 160 based on the historical data 152 and, in some cases, the control data 156. Further, in certain embodiments, the block 206 may include applying one or more feedback data 154. For example, if the prediction model 160 is generated as part of a supervised machine learning process, a user (for example, an administrator) may provide one or more inputs to the model generation system 146 as the prediction model 160 is being generated and/or to refine the prediction model generation process. For example, the user may be aware that a particular region or geographic area had a power outage. In such a case, the user may supply feedback data 154 to reduce the weight of a portion of the historical data 152 that may correspond to users from the affected geographic region during the power outage. Further, in some cases, one or more of the variables or parameters may be weighted using, for example, weights 164. The value of the weight for a variable may be based at least in part on the impact the variable has in generating the prediction model 160 that satisfies, or satisfies within a threshold discrepancy, the control data 156 and/or the historical data 152. In some cases, the combination of the variables and weights may be used to generate a prediction model 160. In some cases, certain types of data may be considered more valuable than other types of data and may therefore be weighted more heavily.

Optionally, at block 208, the model generation system 146 applies a penalty 166 to or associates a penalty 166 with at least some of the one or more prediction models 160 generated at block 206. The penalty associated with each of the one or more prediction models 160 may differ. Further, the penalty for each of the prediction models 160 may be based at least in part on the model type of the prediction model 160 and/or the mathematical algorithm used to combine the parameters 162 of the prediction model 160, and the number of parameters included in the prediction model 160. For example, when generating a prediction model 160, a penalty may be applied that disfavors a very large number of variables or a greater amount of processing power to apply the model. As another example, a prediction model 160 that uses more parameters or variables than another prediction model may be associated with a greater penalty 166 than the prediction model that uses fewer variables. As a further example, a prediction model that uses a model type or a mathematical algorithm that requires a greater amount of processing power to calculate than another prediction model may be associated with a greater penalty than the prediction model that uses a model type or a mathematical algorithm that requires a lower amount of processing power to calculate.

At block 210, the model generation system 146, based at least in part on an accuracy of the prediction model 160 and any associated penalty, selects a prediction model 160. In some embodiments, the model generation system 146 selects a prediction model 160 associated with a lower penalty compared to another prediction model 160. However, in some embodiments, the model generation system 146 may select a prediction model associated with a higher penalty if, for example, the output of the prediction model 160 is a threshold degree more accurate than the prediction model associated with the lower penalty. In certain embodiments, the block 210 may be optional or omitted. For example, in some cases, the prediction models 160 may not be associated with a penalty. In some such cases, a prediction model may be selected from a plurality of prediction models based on the accuracy of the output generated by the prediction model.

Example Computing Resource Adjustment Process

Figure 3:
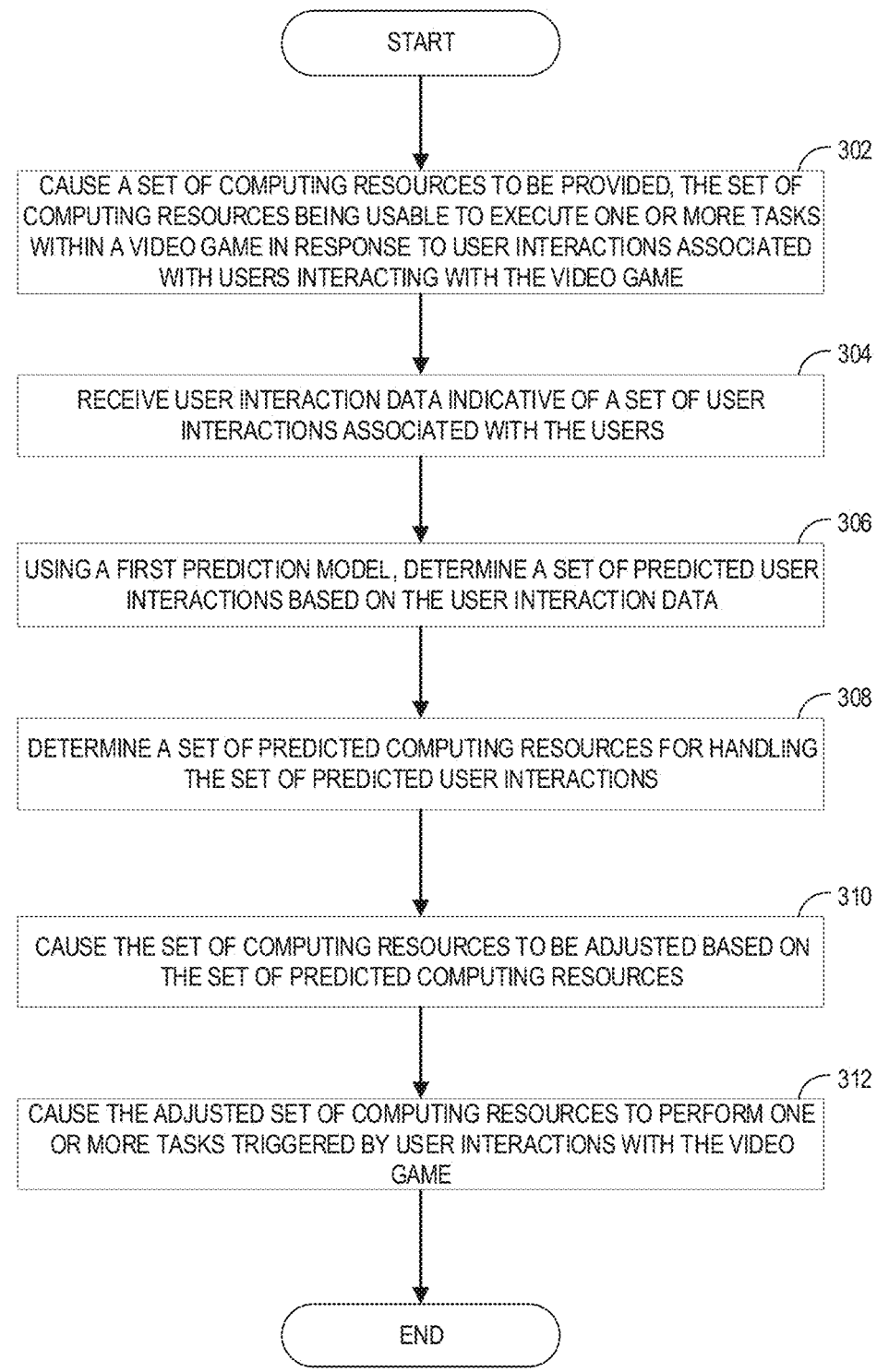
FIG. 3 presents a flowchart of an embodiment of a computing resource adjustment process.

FIG. 3 presents a flowchart of an embodiment of a computing resource adjustment process 300. The process 300 can be implemented by any system that can adjust the amount and type of computing resources maintained for executing, processing, or performing the tasks triggered by user interactions performed by a user playing the video game 112. The process 300, in whole or in part, can be implemented by, for example, an interactive computing system 130, a computing resource adjustment system 118, a game configuration system 134, a model generation system 146, a retention analysis system 140, or a user computing system 110, among others. Although any number of systems, in whole or in part, can implement the process 300, to simplify discussion, the process 300 will be described as being performed by the computing resource adjustment system 118. Further, it should be understood that the process 300 may be performed continuously, periodically, or at arbitrary time intervals. It should also be understood that the process 300 may be performed in real-time, or substantially close to real-time, enabling the computing resources maintained on behalf of the video game 112 to be adjusted dynamically based on the current and predicted user interactions and/or in response to changes in the current and predicted user interactions.

At block 302, the computing resource adjustment system 118 causes a set of computing resources to be provided. The set of computing resources may be usable to generate content (for example, audio, visual, haptic, and the like) to be outputted on the user computing system 110 as part of the video game 112 and/or execute one or more tasks within the video game 112 in response to specific user interactions associated with a plurality of users playing or interacting with the video game 112. The interactive computing system 130 may utilize the set of computing resources to host or execute portions of the video game 112 and/or execute, process, or perform tasks triggered by the specific user interactions performed by a user playing the video game 112. For example, the interactive computing system 130 may utilize the set of resources to facilitate outputting one or more NPCs' speeches to the user, rendering 3-D images as the user explores a new part of the in-game world, sending and receiving voice and text communications to and from other users, and the like. As used herein, the computing resources may refer to any servers, virtual machines, microservices, data, and/or other computing resources needed or desired to generate responses to the user interactions performed by the users playing the video game 112.

In some embodiments, the block 302 includes loading a particular portion of the video game 112 instead of or in addition to providing particular computing resources. For example, the block 302 may load particular maps, dungeons, in-game locations, NPCs, and the like. The determination of portions of the video game 112 to load or pre-load and/or whether to load or pre-load such portions may be based on the location or state of user-playable characters within the video game 112.

At block 304, the computing resource adjustment system 118 receives user interaction data indicative of a set of user interactions associated with one or more of the plurality of users. The user interaction data may include any type of data that indicates one or more in-game interactions initiated by the user during gameplay such as, for example, entering a specific dungeon, initiating a conversation with an NPC, attacking another player, picking up an item, and the like. In some embodiments, a user interaction may also include state information indicative of the state of the user (or the user's in-game playable character) at the time the user performed the user interaction. In other embodiments, the state information and the user interaction are maintained separately.

At block 306, the computing resource adjustment system 118 determines, using a first prediction model, a set of predicted user interactions based at least on the user interaction data. The first prediction model may take one or more user interactions as input and output a list of future user interactions that are likely to follow the inputted user interactions. For example, based on the user having completed quest Q in the video game 112, the computing resource adjustment system 118 may determine, using the first prediction model, that the user has a high probability of talking to NPC N in the video game 112. The set of predicted user indications may include a probability distribution of user interactions likely to be performed by a given user. In some embodiments, the process at block 306 is repeated for each user, and the set of predicted user interactions for each user is aggregated for two or more users (for example, all users currently playing the video game 112 or a subset thereof).

At block 308, the computing resource adjustment system 118 determines, based on the predicted user interactions, a set of predicted computing resources for executing, processing, or performing the tasks triggered by the set of predicted user interactions. In some cases, the computing resource adjustment system 118 may determine the set of predicted computing resources using a second prediction model different from the first prediction model. In some embodiments, the computing resource adjustment system 118 maintains a mapping table mapping the user interactions with the amount and type of computing resources. For example, based on such a mapping table, the computing resource adjustment system 118 may determine that user interaction X triggers execution of microservice P with data A and microservice Q with model N. In a similar manner, the computing resource adjustment system 118 may determine the amount and type of computing resources sufficient to execute, process, or perform the tasks triggered by all of the predicted user interactions determined at block 306. The computing resource adjustment system 118 may determine the set of predicted computing resources based on the execution time associated with the microservices such that the prediction indicates when the predicted computing resources need to be provisioned and/or how long the predicted computing resources need to remain available.

Future usage of computing resources can be predicted in numerous different ways. In some embodiments, the usage of the computing resources (for example, microservices, compute capacity, data, servers, and the like) is used to predict future usage of computing resources. In other embodiments, the history of user interactions is used to predict future usage of computing resources. In yet other embodiments, the actual usage of the computing resources (for example, microservices, compute capacity, data, servers, and the like) as well as the history of user interactions are used to predict future usage of computing resources. In the event that both the actual usage of the computing resources and the history of user interactions are used to predict future usage of computing resources, the system may determine two separate predictions and weight the predictions, for example, using the machine learning techniques described herein or other techniques.

In some embodiments, the block 308 includes predicting particular portions of the video game 112 that are likely to be loaded or interacted with based at least in part on the set of predicted user interactions. Predicting the particular portions of the video game 112 that are likely to be loaded may include predicting the particular portions of the video game 112 that may be subsequently loaded or interacted with within a threshold period of time or by a threshold number of users.

At block 310, the computing resource adjustment system 118 causes the set of computing resources to be adjusted based at least on the set of predicted computing resources. Based on a determination that the computing resources currently maintained in the interactive computing system 130 (or another microservice execution environment) is insufficient, the computing resource adjustment system 118 may cause additional computing resources to be added to the service pool 1030. Based on a determination that the computing resources currently maintained in the interactive computing system 130 (or another microservice execution environment) is excessive, the computing resource adjustment system 118 may cause some of the existing computing resources to be removed from the service pool 1030. In some embodiments, the adjusted amount of computing resources is less than the amount of computing resources used at the peak level. In some embodiments, the adjusted amount of computing resources is different from the amount of computing resources that predicted based only on actual prior usage of the computing resources and not based on the history of user interactions. In some embodiments, based on the number of microservices and/or data needed, the system may determine that additional virtual machine instances and/or virtual containers are needed, and make appropriate requests to acquire such additional compute capacity. For example, based on a determination that the available capacity in the current pool of virtual machines is below a threshold level, the system may request that additional virtual machines be provisioned to increase the available capacity to a level above the threshold level.

In certain embodiments, the block 310 includes loading, pre-loading, or adjusting portions of the video game 112 that are loaded or pre-loaded based at least in part on the predicted particular portions of the video game 112 that are likely to be loaded or interacted with as determined at the block 308. For example, if it is predicted that a threshold number of users are likely to enter a particular cottage in a town, the computing resource adjustment system 118 may pre-load a set of NPCs that are included in the cottage. This set of NPCs may be all the NPCs in the cottage, or those that it is predicted the users are most likely to interact with. Further, pre-loading the NPCs may include pre-loading all features associated with the NPCs, or only some features. For example, the visual portions of each of the NPCs may be pre-loaded, but the speech or audio may be pre-loaded for only a subset of the NPCs that the users are most likely to interact with. As another example, if it is predicted that a threshold number of users are likely to visit a particular dungeon, the dungeon and all it contains may be pre-loaded.

At block 312, the computing resource adjustment system 118 causes the adjusted set of computing resources to perform one or more tasks triggered by user interactions with the video game 112. For example, as one or more of the user interactions predicted at block 306 are actually performed by the users playing the video game 112, the computing resource adjustment system 118 (or another component of the interactive computing system 130) can cause the tasks triggered by such user interactions to be executed, processed, or performed by the adjusted computing resources, which would likely include the microservices configured to execute, process, or perform such tasks. For example, subsequent to predicting that the user is likely to enter a particular new part of the world, the system can load the microservices and data that may be needed to provide the user with the virtual user experience associated with the new part of the world. If the user does indeed enter the new part of the world, the system would not need to instantiate additional microservices or load additional data in response to the user's entry into the new part of the world, since all the microservices and data necessary to provide the user with a smooth virtual user experience should already be in the right place. The results of executing one or more of these microservices are provided to the UI device without the latency associated with, for example, one or more of (i) acquiring the virtual machine or container to be used to execute the microservices, (ii) loading the microservices onto the virtual machine or container, (iii) loading the data needed for executing the microservices onto the virtual machine or container, and/or (iv) pre-loading portions of the video game 112. In some embodiments, the user does not experience a noticeable loading time or lag between a user interaction and a response to the user interaction.

In some embodiments, the operations associated with the block 312 may be optional or omitted. For example, in some cases, the prediction may be incorrect. Accordingly, the one or more tasks or the pre-loaded portions of the video game 112 may be not be triggered or interacted with.

Although in the example of FIG. 3, two separate prediction models are used to predict the likely user interactions and to predict the computing resources needed, respectively, in other embodiments, the computing resource adjustment system 118 utilizes a single prediction model that outputs, based on the user interaction data, a prediction of likely future user interactions as well as a prediction of the amount and type of computing resources needed. In yet other embodiments, the computing resource adjustment system 118 utilizes a single prediction model that outputs, based on the user interaction data, a prediction of the amount and type of computing resources needed.

Example User Interaction Prediction Process

Figure 4:
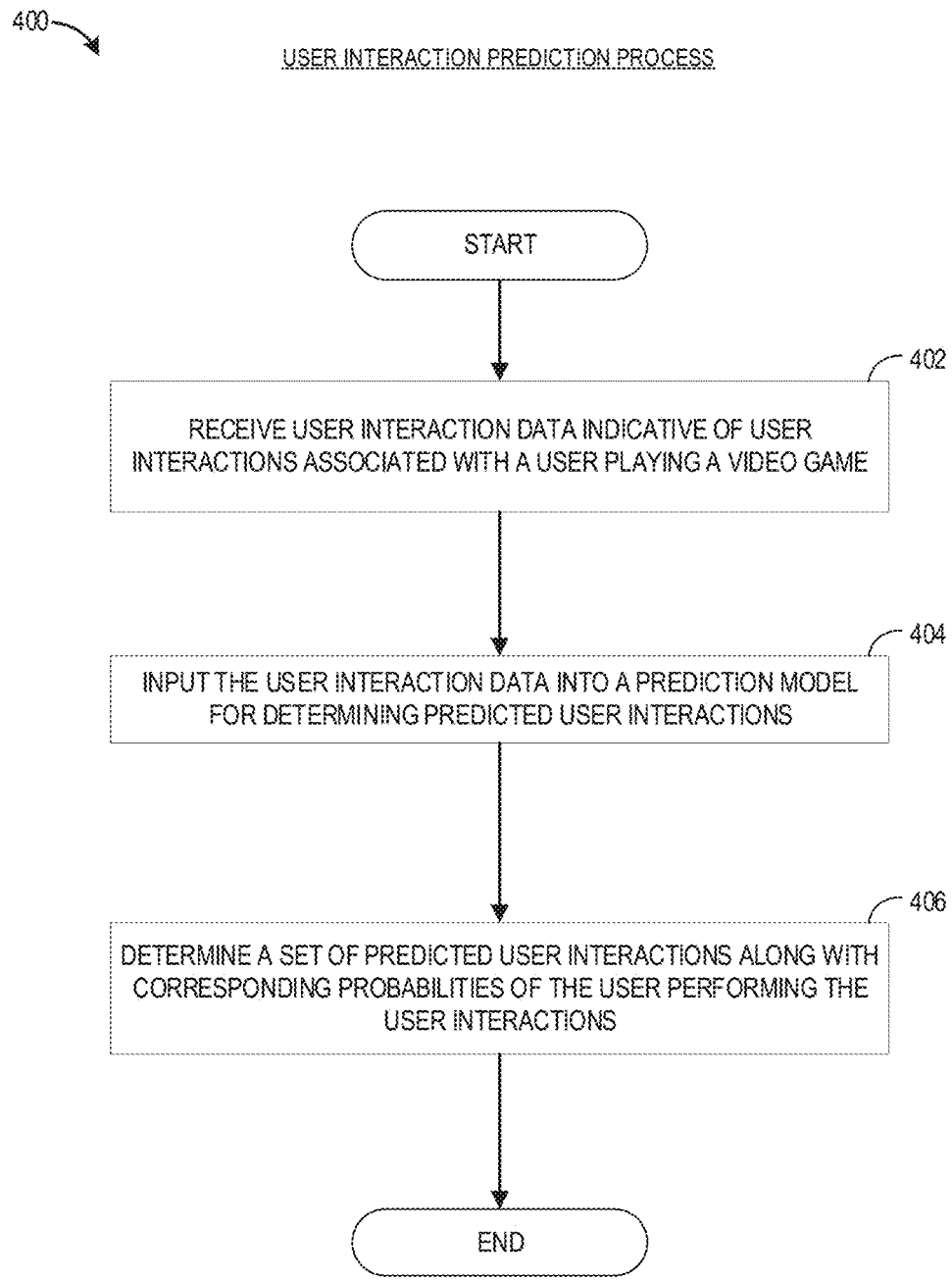
FIG. 4 presents a flowchart of an embodiment of a user interaction prediction process.

FIG. 4 presents a flowchart of an embodiment of a user interaction prediction process 400. The process 400 can be implemented by any system that can adjust the amount and type of computing resources maintained for executing, processing, or performing the tasks triggered by user interactions performed by a user playing the video game 112. The process 400, in whole or in part, can be implemented by, for example, an interactive computing system 130, a computing resource adjustment system 118, a game configuration system 134, a model generation system 146, a retention analysis system 140, or a user computing system 110, among others. Although any number of systems, in whole or in part, can implement the process 400, to simplify discussion, the process 400 will be described as being performed by the user interaction prediction system 120. Further, it should be understood that the process 400 may be performed continuously, periodically, or at arbitrary time intervals. It should also be understood that the process 400 may be performed in real-time, or substantially close to real-time, enabling the computing resources maintained on behalf of the video game 112 to be adjusted dynamically based on the current and predicted user interactions and/or in response to changes in the current and predicted user interactions.

At block 402, the user interaction prediction system 120 receives user interaction data indicative of user interactions associated with a user playing the video game 112. The user interaction data may include any type of data that indicates one or more in-game interactions initiated by the user during gameplay such as, for example, entering a specific dungeon, initiating a conversation with an NPC, attacking another player, picking up an item, and the like.

At block 404, the user interaction prediction system 120 inputs the user interaction data into a prediction model 160 for determining prediction user interactions. The prediction model 160 may take the user interaction data for an individual user as input and output a list of user interactions that the individual user may perform in the future. In some embodiments, the prediction model 160 takes multiple prior user interactions performed by the user as input (for example, the user's history of user interactions) and outputs a single set of predicted user interactions for the user.

At block 406, the user interaction prediction system 120 determines a set of predicted user interactions along with corresponding probabilities of the user performing the user interactions. For example, the prediction may indicate that, based on the user having performed user interaction X in user state S, the probability that the user will perform user interaction Y within 1 minute is 12%, the probability that the user will perform user interaction Y between 1 to 2 minutes is 23%, the probability that the user will perform user interaction Y between 2 to 3 minutes is 6%, the probability that the user will perform user interaction Z within 1 minute is 8%, the probability that the user will perform user interaction Z between 1 to 2 minutes is 32%, the probability that the user will perform user interaction Z between 2 to 3 minutes is 9%, and so on. Although the predictions are made at 1-minute intervals in some embodiments described herein, other time intervals can be used in other embodiments.

Example Predicted User Interaction Aggregation Process

Figure 5:
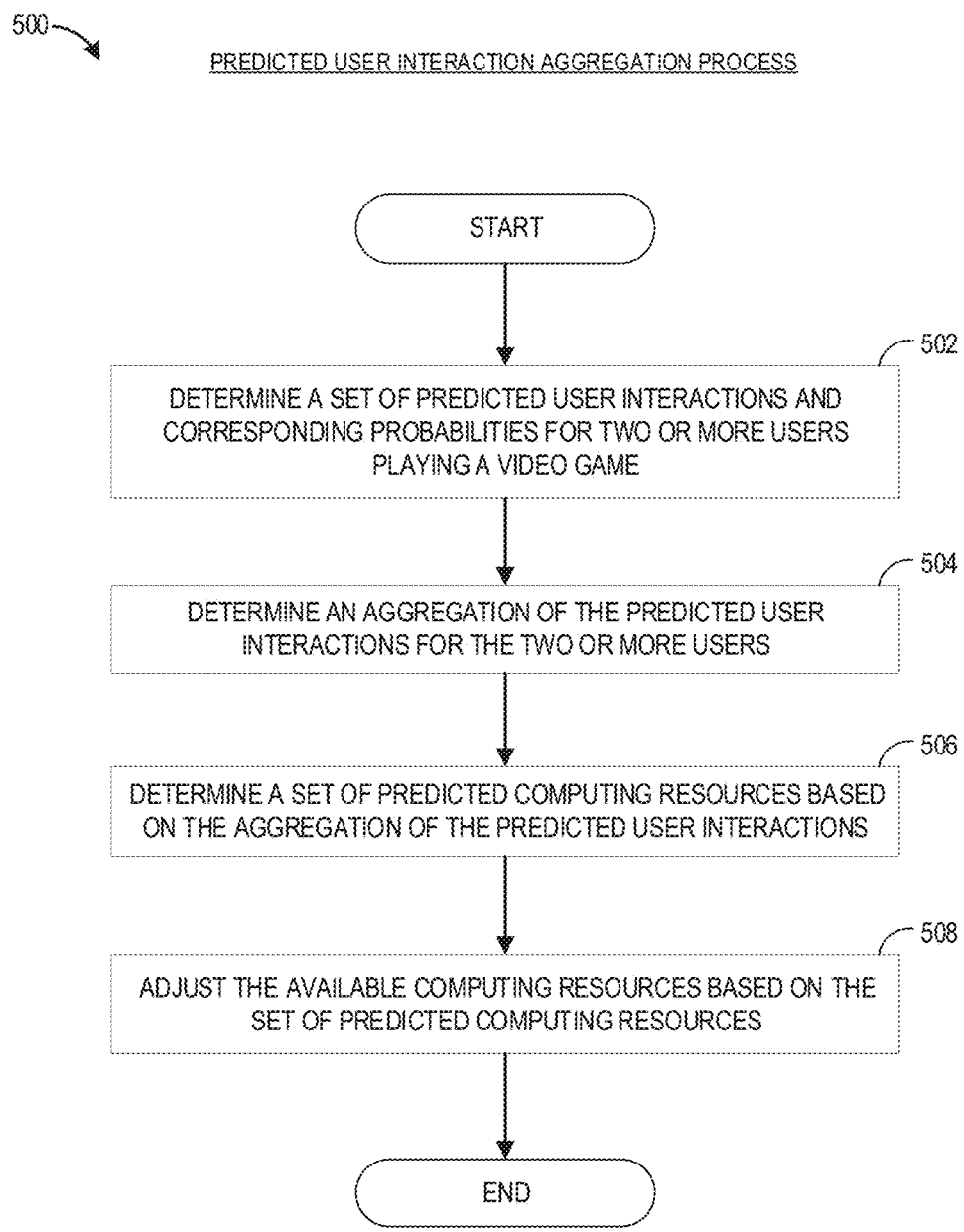
FIG. 5 presents a flowchart of an embodiment of a predicted user interaction aggregation process.

FIG. 5 presents a flowchart of an embodiment of a predicted user interaction aggregation process 500. The process 500 can be implemented by any system that can aggregate the predictions of user interactions associated with multiple users playing the video game 112. The process 500, in whole or in part, can be implemented by, for example, an interactive computing system 130, a computing resource adjustment system 118, a game configuration system 134, a model generation system 146, a retention analysis system 140, or a user computing system 110, among others. Although any number of systems, in whole or in part, can implement the process 500, to simplify discussion, the process 500 will be described as being performed by specific components. Further, it should be understood that the process 500 may be performed continuously, periodically, or at arbitrary time intervals. It should also be understood that the process 500 may be performed in real-time, or substantially close to real-time, enabling the computing resources maintained on behalf of the video game 112 to be adjusted dynamically based on the aggregation of the current and predicted user interactions and/or in response to changes in the aggregation of the current and predicted user interactions.

At block 502, the user interaction aggregation system 122 determines a set of predicted user interactions and corresponding probabilities for two or more users playing the video game 112. For example, the process 400 may be repeated for each of the two or more users (for example, all users currently playing the video game 112 or a subset thereof).

At block 504, the user interaction aggregation system 122 determines an aggregation of the predicted user interactions for the two or more users. For example, the probability distribution of predicted user interactions of user A may be added to the probability distribution of predicted user interactions of user B (in some cases, for each time interval) such that each sum of probability values represents the expected number of user interactions of a specific type (for a given time interval). For example, the aggregated prediction may indicate that, for users A and B, the number of expected user interaction Y being performed within 1 minute is 0.6, the number of expected user interaction Y being performed between 1 to 2 minutes is 0.45, the number of expected user interaction Y being performed between 2 to 3 minutes is 0.09, the number of expected user interaction Z being performed within 1 minute is 0.2, the number of expected user interaction Z being performed between 1 to 2 minutes is 0.05, the number of expected user interaction Z being performed between 2 to 3 minutes is 0.12, and so on (where each summed value is theoretically less than 2). Although summation is used in the example of FIG. 5, other methods of aggregating the predicted user interactions of the individual users may be used. For example, a prediction model 160 for aggregating the predicted user interactions of multiple users may be generated according to the process illustrated in FIG. 1C and used instead of the summation described at block 504.

At block 506, the computing resource prediction system 124 determines a set of predicted computing resources based on the sum of the predicted user interactions. For example, the process described with respect to block 308 of FIG. 3 may be performed using the sum of the predicted user interactions.

At block 508, the computing resource adjustment system 118 (or the service controller 1080 of FIG. 1A) adjusts the available computing resources based on the set of predicted computing resources. Based on a determination that the computing resources currently maintained in the interactive computing system 130 (or another microservice execution environment) is insufficient, the computing resource adjustment system 118 may cause additional computing resources to be added to the service pool 1030. Based on a determination that the computing resources currently maintained in the interactive computing system 130 (or another microservice execution environment) is excessive, the computing resource adjustment system 118 may cause some of the existing computing resources to be removed from the service pool 1030.

Although the example of FIG. 5 describes determining predicted user interactions for two or more users and aggregating the determined predicted user interactions, in other embodiments, the computing resource adjustment system 118 may (for example, using one or more prediction models) analyze the set of user interactions belonging to multiple users collectively and determine the aggregation described at block 504 based on the collective set of user interactions (for example, as opposed to predicted user interactions). In some embodiments, the aggregation determined based on the collective set of user interactions is different than the aggregation determined by first determining, for each individual user of multiple users, the predicted user interactions and then summing the predicted user interactions of all of the multiple users.

In some embodiments, based on a group of users having performed the same user action(s), the computing resource adjustment system 118 may (for example, using one or more prediction models) assume that these users are likely to perform the same actions in the near future and determine predicted user interactions that are the identical or substantially similar for such group of users.

Example Computing Resource Prediction Process

Figure 6:
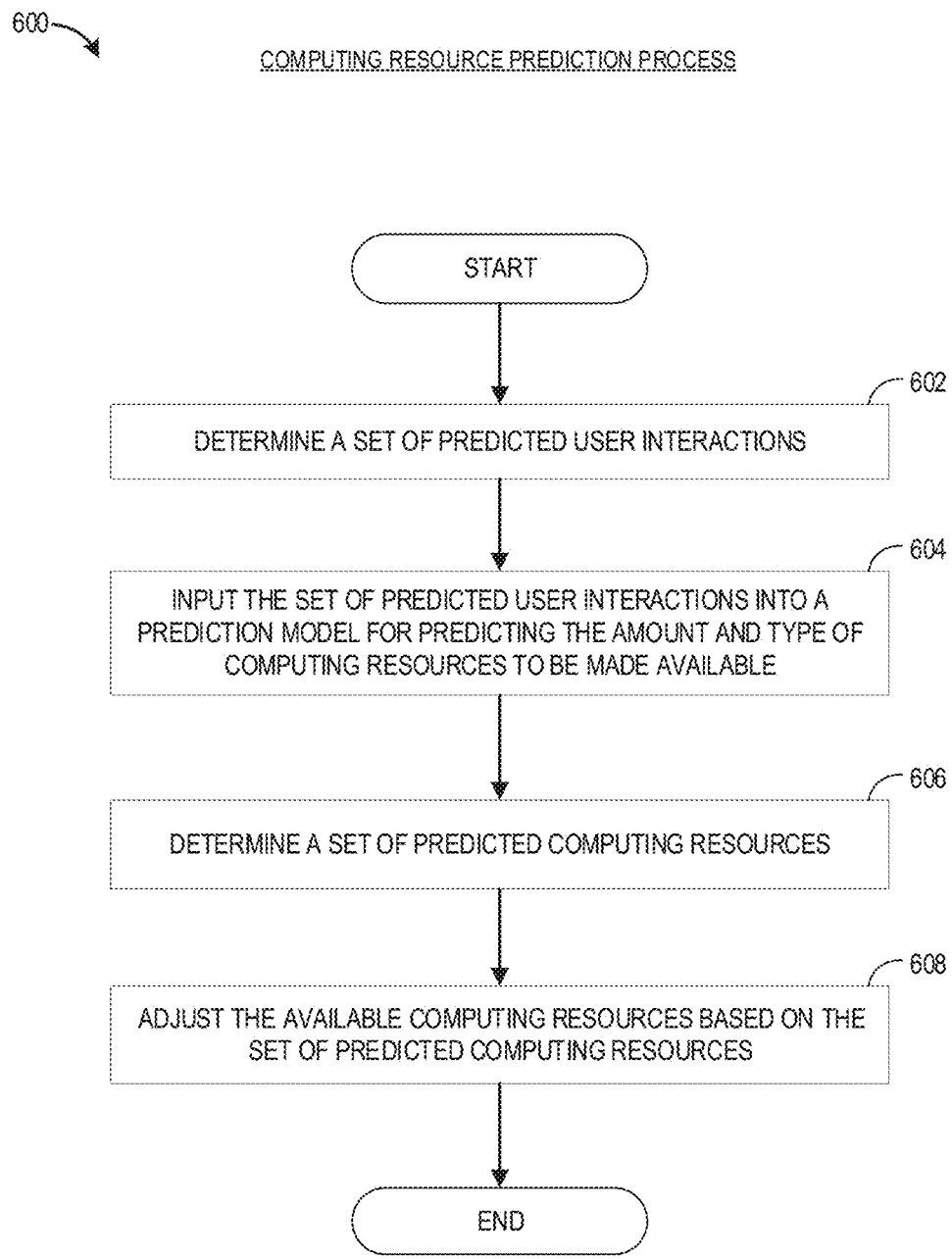
FIG. 6 presents a flowchart of an embodiment of a computing resource prediction process.

FIG. 6 presents a flowchart of an embodiment of a computing resource prediction process 600. The process 600 can be implemented by any system that can predict the amount and type of computing resources necessary to execute, process, or perform tasks triggered by a given number and type of user interactions performed by users playing the video game 112. The process 600, in whole or in part, can be implemented by, for example, an interactive computing system 130, a computing resource adjustment system 118, a game configuration system 134, a model generation system 146, a retention analysis system 140, ora user computing system 110, among others. Although any number of systems, in whole or in part, can implement the process 600, to simplify discussion, the process 600 will be described as being performed by specific components. Further, it should be understood that the process 600 may be performed continuously, periodically, or at arbitrary time intervals. It should also be understood that the process 600 may be performed in real-time, or substantially close to real-time, enabling the computing resources maintained on behalf of the video game 112 to be adjusted dynamically based on the current and predicted user interactions and/or in response to changes in the current and predicted user interactions.

At block 602, the computing resource prediction system 124 determines a set of predicted user interactions corresponding to multiple users playing the video game 112. For example, the set of predicted user interactions may be determined by first determining the predicted user interactions for individual users and aggregating the predicted user interactions based on the process described with reference to block 504 of FIG. 5.

At block 604, the computing resource prediction system 124 inputs the set of predicted user interactions into a prediction model 160 for predicting the amount and type of computing resources to be made available in the interactive computing system 130 (or another microservice execution environment).

At block 606, the computing resource prediction system 124 determines a set of predicted computing resources, which may be the output of the prediction model 160 utilized at block 604. The set of predicted computing resources may indicate the amount and type of computing resources that should be made available at various time intervals (e.g., within a minute, between 1-2 minutes, within for the next 5 minutes, for the next hour, and so on).

At block 608, the computing resource adjustment system 118 (or the service controller 1080 of FIG. 1A) adjusts the available computing resources based on the set of predicted computing resources. Based on a determination that the computing resources currently maintained in the interactive computing system 130 (or another microservice execution environment) is insufficient, the computing resource adjustment system 118 may cause additional computing resources to be added to the service pool 1030. Based on a determination that the computing resources currently maintained in the interactive computing system 130 (or another microservice execution environment) is excessive, the computing resource adjustment system 118 may cause some of the existing computing resources to be removed from the service pool 1030.

Example Prediction Model Modification Process

Figure 7:
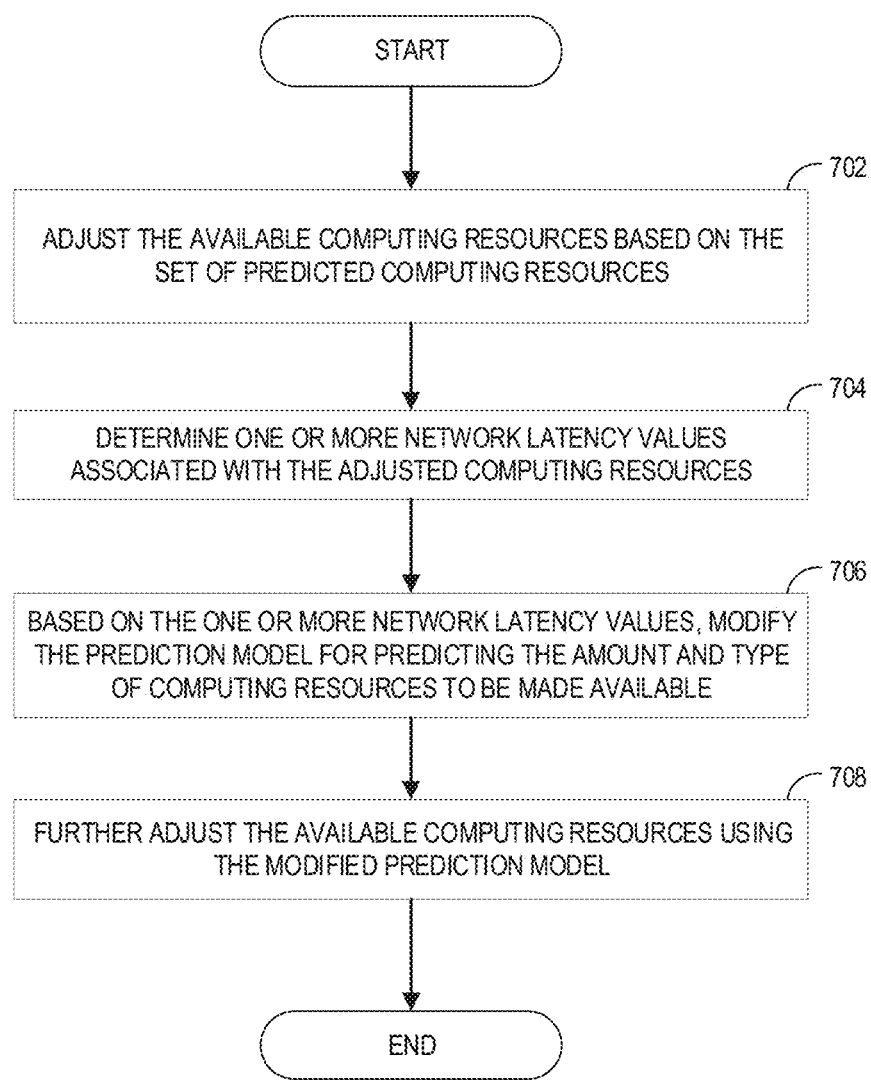
FIG. 7 presents a flowchart of an embodiment of a prediction model modification process.

FIG. 7 presents a flowchart of an embodiment of a prediction model modification process 700. The process 700 can be implemented by any system that can predict the amount and type of computing resources necessary to execute, process, or perform tasks triggered by a given number and type of user interactions performed by users playing the video game 112. The process 700, in whole or in part, can be implemented by, for example, an interactive computing system 130, a computing resource adjustment system 118, a game configuration system 134, a model generation system 146, a retention analysis system 140, or a user computing system 110, among others. Although any number of systems, in whole or in part, can implement the process 700, to simplify discussion, the process 700 will be described as being performed by specific components. Further, it should be understood that the process 700 may be performed continuously, periodically, or at arbitrary time intervals. It should also be understood that the process 700 may be performed in real-time, or substantially close to real-time, enabling the prediction models 160 to reflect any additional data or feedback gathered by the interactive computing system 130 since the predictions were made, and further enabling the amount and type of computing resources maintained on behalf of the video game 112 to be optimized or improved based on the modified prediction models.

At block 702, the computing resource adjustment system 118 (or the service controller 1080 of FIG. 1A) adjusts the available computing resources based on the set of predicted computing resources.

At block 704, the prediction model modification system 126 determines one or more latency values associated with the adjusted computing resources. For example, as one or more of the user interactions predicted at block 306 are actually performed by the users playing the video game 112, the computing resource adjustment system 118 (or another component of the interactive computing system 130) can cause the tasks triggered by such user interactions to be executed, processed, or performed by the adjusted computing resources, which would likely include the microservices configured to execute, process, or perform such tasks. The latency values associated with such executing, processing, or performing of the tasks may be determined and stored in a database in the interactive computing system 130 (for example, in the event logs 1040). A latency value may indicate the amount of the delay between (i) the time at which a user interaction is initiated or performed, and (ii) the time at which a response to the user interaction is outputted to the user. For example, one latency value in the database may indicate the amount of time elapsed between the user requesting to enter dungeon X, and the dungeon X being actually presented on the display of the user computing system 110. As another example, one latency value in the database may indicate the amount of time elapsed between the user initiating a conversation with an NPC, and the NPC's response being outputted to the user (for example, on the display of the user computing system 110 or via the speaker of the user computing system 110).

At block 706, the prediction model modification system 126 modifies, based on the one or more latency values, the prediction model for predicting the amount and type of computing resources to be made available in the interactive computing system 130 (or another microservice execution environment). For example, if the event logs 1040 indicate that when the user clicked on an NPC to talk to her, and the NPC's verbal message was outputted on the UI device 1010 after 2 seconds, this high latency value may indicate that the system did not have a sufficient number of instances of the microservice responsible for generating and providing the NPC's response to the user running in the service pool 1030. Accordingly, the prediction model modification system 126 may modify the prediction model such that the modified prediction model outputs, for a user interaction of initiating a conversation with this particular NPC, a predicted number of this specific microservice that is greater than the prediction model would prior to the modification. Alternatively, or additionally, the prediction model modification system 126 may modify the prediction model for predicting the number and type of user interactions to be performed in the future such that the modified prediction model outputs, for the user interaction data of this particular user, a probability of the user initiating a conversation with this particular NPC that is greater than the prediction model would prior to the modification.

At block 708, the computing resource adjustment system 118 (or the service controller 1080 of FIG. 1A) further adjusts the available computing resources using the modified prediction model. Based on a determination that the computing resources currently maintained in the interactive computing system 130 (or another microservice execution environment) is insufficient, the computing resource adjustment system 118 may cause additional computing resources to be added to the service pool 1030. Based on a determination that the computing resources currently maintained in the interactive computing system 130 (or another microservice execution environment) is excessive, the computing resource adjustment system 118 may cause some of the existing computing resources to be removed from the service pool 1030.

Overview of Computing System

Figure 8:
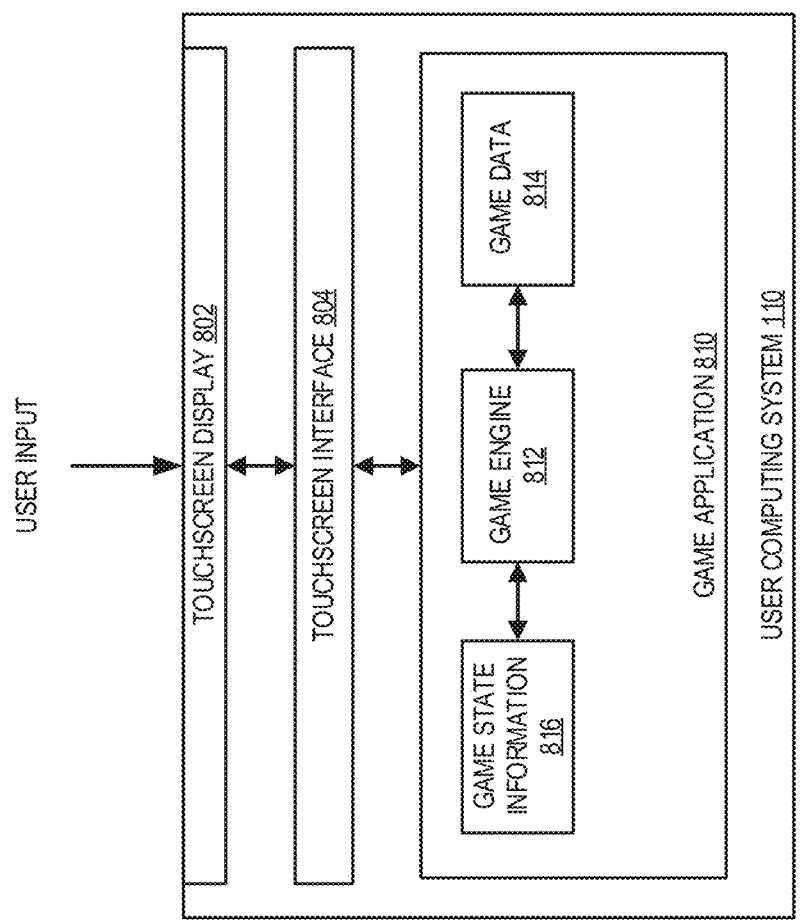
FIG. 8 illustrates an embodiment of a user computing system.

FIG. 8 illustrates an embodiment of a user computing system 110, which may also be referred to as a gaming system. As illustrated, the user computing system 110 may be a single computing device that can include a number of elements. However, in some cases, the user computing system 110 may include multiple devices. For example, the user computing system 110 may include one device that includes a central processing unit and a graphics processing unit, another device that includes a display, and another device that includes an input mechanism, such as a keyboard or mouse.

The user computing system 110 can be an embodiment of a computing system that can execute a game system. In the non-limiting example of FIG. 8, the user computing system 110 is a touch-capable computing device capable of receiving input from a user via a touchscreen display 802. However, the user computing system 110 is not limited as such and may include non-touch capable embodiments, which do not include the touchscreen display 802.

The user computing system 110 includes a touchscreen display 802 and a touchscreen interface 804, and is configured to execute a game application 810. The game application 810 may be the video game 112 or an application that executes in conjunction with or in support of the video game 112, such as a video game execution environment. Although described as a game application, in other embodiments, the game application 810 may be another type of application that may have a variable execution state based at least in part on the preferences or capabilities of a user, such as educational software. While the user computing system 110 includes the touchscreen display 802, it is recognized that a variety of input devices may be used in addition to or in place of the touchscreen display 802.

The user computing system 110 can include one or more processors, such as central processing units (CPUs), graphics processing units (GPUs), and accelerated processing units (APUs). Further, the user computing system 110 may include one or more data storage elements. In some embodiments, the user computing system 110 can be a specialized computing device created for the purpose of executing the game applications 810. For example, the user computing system 110 may be a video game console. The game applications 810 executed by the user computing system 110 may be created using a particular application programming interface (API) or compiled into a particular instruction set that may be specific to the user computing system 110. In some embodiments, the user computing system 110 may be a general purpose computing device capable of executing the game applications 810 and other non-game applications. For example, the user computing system 110 may be a laptop with an integrated touchscreen display or desktop computer with an external touchscreen display. Components of an example embodiment of the user computing system 110 are described in more detail with respect to FIG. 9.

The touchscreen display 802 can be a capacitive touchscreen, a resistive touchscreen, a surface acoustic wave touchscreen, or other type of touchscreen technology that is configured to receive tactile inputs, also referred to as touch inputs, from a user. For example, the touch inputs can be received via a finger touching the screen, multiple fingers touching the screen, a stylus, or other stimuli that can be used to register a touch input on the touchscreen display 802. The touchscreen interface 804 can be configured to translate the touch input into data and output the data such that the outputted data can be interpreted by components of the user computing system 110, such as an operating system and the game application 810. The touchscreen interface 804 can translate characteristics of the tactile touch input touch into touch input data. Some example characteristics of a touch input can include, shape, size, pressure, location, direction, momentum, duration, and/or other characteristics. The touchscreen interface 804 can be configured to determine the type of touch input, such as, for example a tap (for example, touch and release at a single location) or a swipe (for example, movement through a plurality of locations on touchscreen in a single touch input). The touchscreen interface 804 can be configured to detect and output touch input data associated with multiple touch inputs occurring simultaneously or substantially in parallel. In some cases, the simultaneous touch inputs may include instances where a user maintains a first touch on the touchscreen display 802 while subsequently performing a second touch on the touchscreen display 802. The touchscreen interface 804 can be configured to detect movement of the touch inputs. The touch input data can be transmitted to components of the user computing system 110 for processing. For example, the touch input data can be transmitted directly to the game application 810 for processing.

In some embodiments, the touch input data can undergo processing and/or filtering by the touchscreen interface 804, an operating system, or other components prior to being output to the game application 810. As one example, raw touch input data can be captured from a touch input. The raw data can be filtered to remove background noise, pressure values associated with the input can be measured, and location coordinates associated with the touch input can be calculated. The type of touch input data provided to the game application 810 can be dependent upon the specific implementation of the touchscreen interface 804 and the particular API associated with the touchscreen interface 804. In some embodiments, the touch input data can include location coordinates of the touch input. The touch signal data can be output at a defined frequency. Processing the touch inputs can be computed many times per second and the touch input data can be output to the game application for further processing.

The game application 810 can be configured to be executed on the user computing system 110. The game application 810 may also be referred to as a video game, a game, game code and/or a game program. A game application should be understood to include software code that the user computing system 110 can use to provide a game for a user to play. The game application 810 might comprise software code that informs the user computing system 110 of processor instructions to execute, but might also include data used in the playing of the game, such as data relating to constants, images, and other data structures. For example, in the illustrated embodiment, the game application 810 includes a game engine 812, game data 814, and game state information 816.

The touchscreen interface 804 or another component of the user computing system 110, such as the operating system, can provide user input, such as touch inputs, to the game application 810. In some embodiments, the user computing system 110 may include alternative or additional user input devices, such as a mouse, a keyboard, a camera, a game controller, and the like. A user can interact with the game application 810 via the touchscreen interface 804 and/or one or more of the alternative or additional user input devices. The game engine 812 can be configured to execute aspects of the operation of the game application 810 within the user computing system 110. Execution of aspects of gameplay within a game application can be based, at least in part, on the user input received, the game data 814, and game state information 816. The game data 814 can include game rules, prerecorded motion capture poses/paths, environmental settings, constraints, animation reference curves, skeleton models, and/or other game application information. Further, the game data 814 may include information that is used to set or adjust the difficulty of the game application 810.

The game engine 812 can execute gameplay within the game according to the game rules. Some examples of game rules can include rules for scoring, possible inputs, actions/events, movement in response to inputs, and the like. Other components can control what inputs are accepted and how the game progresses, and other aspects of gameplay. During execution of the game application 810, the game application 810 can store game state information 816, which can include character states, environment states, scene object storage, and/or other information associated with a state of execution of the game application 810. For example, the game state information 816 can identify the state of the game application 810 at a specific point in time, such as a character position, character action, game level attributes, and other information contributing to a state of the game application.

The game engine 812 can receive the user inputs and determine in-game events, such as actions, collisions, runs, throws, attacks, and other events appropriate for the game application 810. During operation, the game engine 812 can read in the game data 814 and the game state information 816 in order to determine the appropriate in-game events. In one example, after the game engine 812 determines the character events, the character events can be conveyed to a movement engine that can determine the appropriate motions the characters should make in response to the events and passes those motions onto an animation engine. The animation engine can determine new poses for the characters and provide the new poses to a skinning and rendering engine. The skinning and rendering engine, in turn, can provide character images to an object combiner in order to combine animate, inanimate, and background objects into a full scene. The full scene can be conveyed to a renderer, which can generate a new frame for display to the user. The process can be repeated for rendering each frame during execution of the game application 810. Though the process has been described in the context of a character, the process can be applied to any process for processing events and rendering the output for display to a user.

Example Hardware Configuration of Computing System

Figure 9:
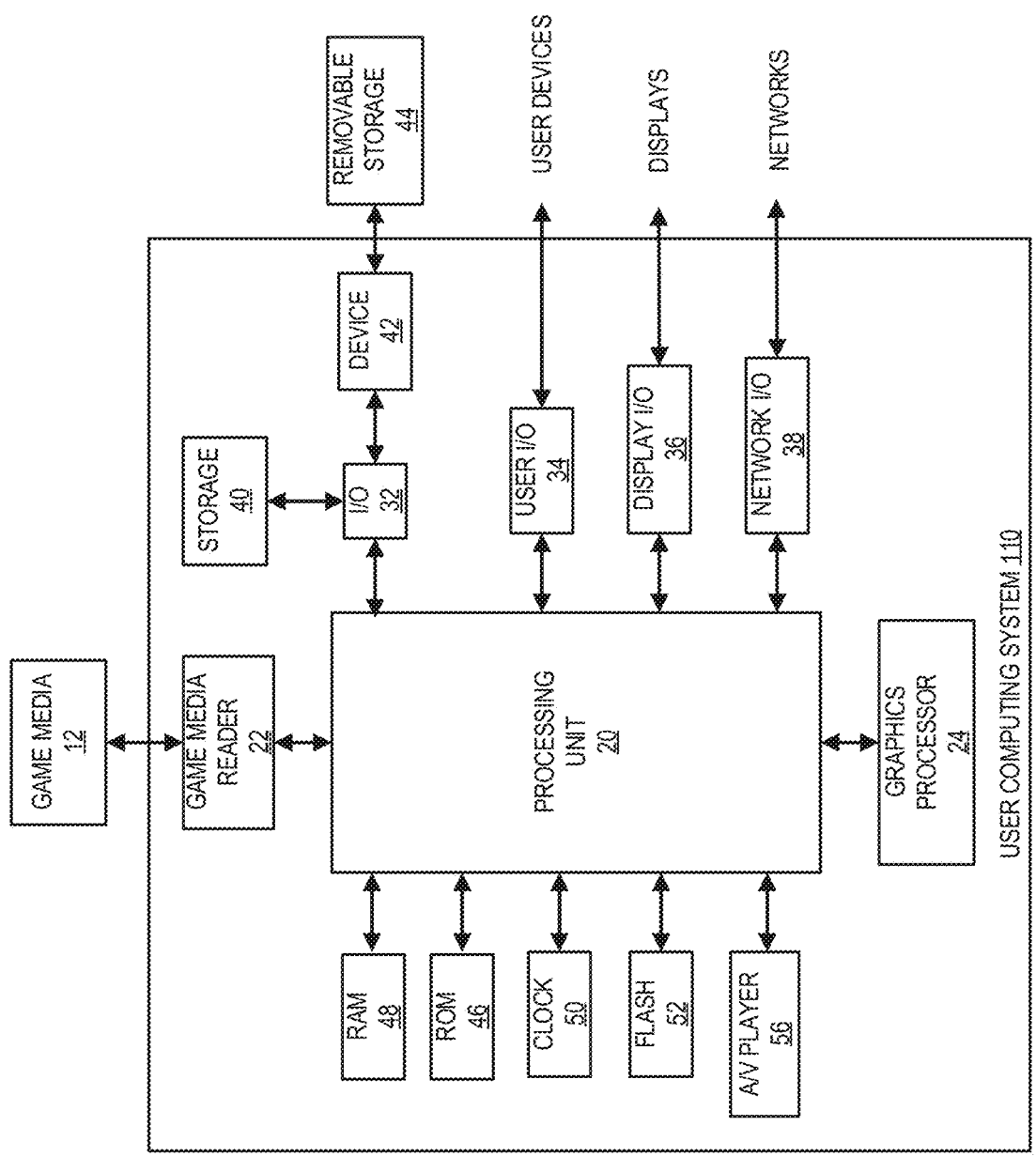
FIG. 9 illustrates an embodiment of a hardware configuration for the user computing system of FIG. 8.

FIG. 9 illustrates an embodiment of a hardware configuration for the user computing system 110 of FIG. 8. Other variations of the user computing system 110 may be substituted for the examples explicitly presented herein, such as removing or adding components to the user computing system 110. The user computing system 110 may include a dedicated game device, a smart phone, a tablet, a personal computer, a desktop, a laptop, a smart television, a car console display, and the like. Further, although not explicitly illustrated in FIG. 9, the user computing system 110 may optionally include a touchscreen display 802 and a touchscreen interface 804 as described with respect to FIG. 8.

As shown, the user computing system 110 includes a processing unit 20 that interacts with other components of the user computing system 110 and also components external to the user computing system 110. The user computing system 110 may include a game media reader 22 that can communicate with game media 12. The game media reader 22 may be an optical disc reader capable of reading optical discs, such as CD-ROM or DVDs, or any other type of reader that can receive and read data from the game media 12. In some embodiments, the game media reader 22 may be optional or omitted. For example, game content or applications may be accessed over a network via a network I/O 38 rendering the game media reader 22 and/or the game media 12 optional.

The user computing system 110 may include a separate graphics processor 24. In some cases, the graphics processor 24 may be built into the processing unit 20, such as with an APU. In some such cases, the graphics processor 24 may share random-access memory (RAM) with the processing unit 20. Alternatively, or additionally, the user computing system 110 may include a discrete graphics processor 24 that is separate from the processing unit 20. In some such cases, the graphics processor 24 may have separate RAM from the processing unit 20. Further, in some cases, the graphics processor 24 may work in conjunction with one or more additional graphics processors and/or with an embedded or non-discrete graphics processing unit, which may be embedded into a motherboard, which is sometimes referred to as an on-board graphics chip or device.

The user computing system 110 also includes various components for enabling input/output, such as an I/O 32, a user I/O 34, a display I/O 36, and a network I/O 38. As previously described, the input/output components may, in some cases, include touch-enabled devices. The I/O 32 interacts with storage 40 and, through a device 42, removable storage media 44 in order to provide storage for the user computing system 110. The processing unit 20 can communicate through the I/O 32 to store data, such as game state data and any shared data files. In addition to the storage 40 and the removable storage media 44, the user computing system 110 is also shown as including read-only memory (ROM) 46 and RAM 48. The RAM 48 may be used for data that is accessed frequently, such as when a game is being played.

The user I/O 34 is used to send and receive commands between the processing unit 20 and user devices, such as game controllers. In some embodiments, the user I/O 34 includes touchscreen inputs. As previously described, the touchscreen can be a capacitive touchscreen, a resistive touchscreen, or other type of touchscreen technology that is configured to receive user input through tactile inputs from the user. The display I/O 36 provides input/output functions that are used to display images from the game being played. The network I/O 38 is used for input/output functions for a network. The network I/O 38 may be used during execution of a game, such as when a game is being played online or being accessed online.

Display output signals may be produced by the display I/O 36 and can include signals for displaying visual content produced by the user computing system 110 on a display device, such as graphics, user interfaces, video, and/or other visual content. The user computing system 110 may comprise one or more integrated displays configured to receive display output signals produced by the display I/O 36, which may be outputted for display to a user. According to some embodiments, display output signals produced by the display I/O 36 may also be outputted to one or more display devices external to the user computing system 110.

The user computing system 110 can also include other features that may be used with a game, such as a clock 50, flash memory 52, and other components. An audio/video player 56 might also be used to play a video sequence, such as a movie. It should be understood that other components may be provided in the user computing system 110 and that a person skilled in the art will appreciate other variations of the user computing system 110.

Program code can be stored in the ROM 46, the RAM 48, or the storage 40 (which might comprise hard disk, other magnetic storage, optical storage, solid state drives, and/or other non-volatile storage, or a combination or variation of these). At least part of the program code can be stored in ROM that is programmable (ROM, PROM, EPROM, EEPROM, and so forth), in the storage 40, and/or on removable media such as the game media 12 (which can be a CD-ROM, cartridge, memory chip, or the like, or obtained over a network or other electronic channel as needed). In general, program code can be found embodied in a tangible non-transitory signal-bearing medium.

The RAM 48 (and possibly other storage) is usable to store variables and other game and processor data as needed. The RAM 48 may be used to store data that is generated during gameplay and portions thereof may also be reserved for frame buffers, game state, and/or other data needed or usable for interpreting user input and generating game displays. Generally, the RAM 48 is volatile storage and data stored within the RAM 48 may be lost when the user computing system 110 is turned off or loses power.

As the user computing system 110 reads the game media 12 and provides a game, information may be read from the game media 12 and stored in a memory device, such as the RAM 48. Additionally, data from the storage 40, the ROM 46, servers accessed via a network (not shown), or the removable storage media 46 may be read and loaded into the RAM 48. Although data is described as being found in the RAM 48, it will be understood that data does not have to be stored in the RAM 48 and may be stored in other memory accessible to the processing unit 20 or distributed among several media, such as the game media 12 and the storage 40.

OTHER CONSIDERATIONS

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:
   as implemented by an interactive computing system configured with specific computer-executable instructions,
      causing a set of computing resources to be provided, the set of computing resources being usable to execute one or more tasks within a video game in response to user interactions associated with a plurality of users interacting with the video game;
      receiving user interaction data indicative of a set of user interactions associated with one or more of the plurality of users;
      using a first prediction model, determining a set of predicted user interactions based at least on the user interaction data;
      determining, based at least on the set of predicted user interactions, a set of predicted computing resources to perform tasks triggered by the set of predicted user interactions;
      causing the set of computing resources to be adjusted based at least on the set of predicted computing resources; and
      performing one or more tasks triggered by user interactions with the video game using the adjusted set of computing resources.

2. The computer-implemented method of claim 1, further comprising generating the first prediction model at least by:
   accessing first user interaction data indicative of a first set of user interactions associated with two or more users of the plurality of users, wherein at least some of the user interactions in the first set are performed by the same user; and
   using one or more machine learning algorithms to determine the first prediction model based at least on the first user interaction data.

3. The computer-implemented method of claim 1, wherein the set of predicted computing resources is determined using a second prediction model different from the first prediction model.

4. The computer-implemented method of claim 3, further comprising generating the second prediction model at least by:
   accessing (i) second user interaction data indicative of a second set of user interactions associated with two or more users of the plurality of users and (ii) computing resource data indicative of a first set of computing resources; and
   using one or more machine learning algorithms to determine the second prediction model based at least on the second user interaction data and the computing resource data.

5. The computer-implemented method of claim 1, wherein the one or more tasks comprise one or more of collision detection, ray tracing, image rendering, special effects generation, animation generation, speech content generation, text content generation, haptic content generation, and physics simulation.

6. The computer-implemented method of claim 1, wherein the set of predicted computing resources comprises a number of virtual machine instances to be acquired for processing the tasks triggered by the set of predicted user interactions.

7. The computer-implemented method of claim 1, wherein the set of predicted computing resources comprises a number of microservices to be loaded onto one or more virtual machine instances or virtual containers, wherein the microservices are configured to execute tasks to be triggered by performance of the set of predicted user interactions.

8. The computer-implemented method of claim 1, wherein the set of predicted computing resources comprises a set of files to be loaded onto one or more virtual machine instances or virtual containers for use by one or more microservices configured to execute tasks to be triggered by performance of the set of predicted user interactions.

9. The computer-implemented method of claim 1, further comprising:
   receiving additional user interaction data indicative of a set of additional user interactions associated with one or more of the plurality of users interacting with the video game; and
   further adjusting the adjusted set of computing resources based at least on the additional user interaction data.

10. The computer-implemented method of claim 1, wherein the number of users in the plurality of users interacting with the game simultaneously is in the order of hundreds of thousands of users or greater.

11. The computer-implemented method of claim 3, wherein the second prediction model comprises a mapping table associating one or more user interactions to one or more microservices to be executed to provide corresponding virtual user experiences in response to the one or more user interactions.

12. The computer-implemented method of claim 3, further comprising:
   determining one or more latency values associated with a type of user interaction in the video game; and
   based at least on the one or more latency values, modifying the second prediction model such that the modified second prediction model would cause a greater amount of computing resources to be provisioned for the type of user interaction than the second prediction model prior to the modification.

13. A system comprising:
   an electronic data store configured to store user interaction data associated with a video game; and
   a hardware processor in communication with the electronic data store, the hardware processor configured to execute specific computer-executable instructions to at least:
      cause a set of computing resources to be provided, the set of computing resources being usable to execute one or more tasks within the video game in response to specific user interactions associated with a plurality of users interacting with the video game;

receive user interaction data indicative of a set of user interactions associated with one or more of the plurality of users;

using a first prediction model, determine a set of predicted user interactions based at least on the user interaction data;

determine, based at least on the set of predicted user interactions, a set of predicted computing resources to perform tasks triggered by the set of predicted user interactions;

cause the set of computing resources to be adjusted based at least on the set of predicted computing resources; and cause the adjusted set of computing resources to perform one or more tasks triggered by user interactions with the video game.

14. The system of claim 13, wherein the set of predicted computing resources comprises a combination of a number of virtual machine instances to be acquired for processing the tasks triggered by the set of predicted user interactions and a number of microservices to be loaded onto one or more of such virtual machine instances or virtual containers created thereon.

15. The system of claim 13, wherein the hardware processor is further configured to execute the specific computer-executable instructions to:

receive additional user interaction data indicative of a set of additional user interactions associated with one or more of the plurality of users interacting with the video game; and cause the adjusted set of computing resources to be further adjusted based at least on the additional user interaction data.

16. The system of claim 13, wherein the set of predicted computing resources is determined using a second prediction model different from the first prediction model, the hardware processor being further configured to execute the specific computer-executable instructions to:

determine one or more latency values associated with a type of user interaction in the video game; and based at least on the one or more latency values, modify the second prediction model such that the modified second prediction model would cause a greater amount of computing resources to be provisioned for the type of user interaction than the second prediction model prior to the modification.

17. Non-transitory physical computer storage storing specific computer-executable instructions that, when executed by one or more hardware computing devices, cause the hardware computing devices to at least:

cause a set of computing resources to be provided, the set of computing resources being usable to execute one or more tasks within a video game in response to specific user interactions associated with a plurality of users interacting with the video game;

receive user interaction data indicative of a set of user interactions associated with one or more of the plurality of users;

using a first prediction model, determine a set of predicted user interactions based at least on the user interaction data;

determine, based at least on the set of predicted user interactions, a set of predicted computing resources to perform tasks triggered by the set of predicted user interactions;

cause the set of computing resources to be adjusted based at least on the set of predicted computing resources; and cause the adjusted set of computing resources to perform one or more tasks triggered by user interactions with the video game.

18. The non-transitory physical computer storage of claim 17, wherein the set of predicted computing resources comprises a combination of a number of virtual machine instances to be acquired for processing the tasks triggered by the set of predicted user interactions and a number of microservices to be loaded onto one or more of such virtual machine instances or virtual containers created thereon.

19. The non-transitory physical computer storage of claim 17, wherein the specific computer-executable instructions further cause the one or more hardware computing devices to:

receive additional user interaction data indicative of a set of additional user interactions associated with one or more of the plurality of users interacting with the video game; and cause the adjusted set of computing resources to be further adjusted based at least on the additional user interaction data.

20. The non-transitory physical computer storage of claim 17, wherein the set of predicted computing resources is determined using a second prediction model different from the first prediction model, the specific computer-executable instructions further causing the one or more hardware computing devices to:

determine one or more latency values associated with a type of user interaction in the video game; and based at least on the one or more latency values, modify the second prediction model such that the modified second prediction model would cause a greater amount of computing resources to be provisioned for the type of user interaction than the second prediction model prior to the modification.

* * * * *